(12) United States Patent
VanDelden

(10) Patent No.: US 6,674,532 B2
(45) Date of Patent: Jan. 6, 2004

(54) INTERFEROMETRIC POLARIZATION INTERROGATING FILTER ASSEMBLY AND METHOD

(76) Inventor: Jay S. VanDelden, 755 W. Vistoso Highlands Dr., Bldg. 6, Unit 112, Tucson, AZ (US) 85737

( * ) Notice: Subject to any disclaimer, the term of this patent is extended or adjusted under 35 U.S.C. 154(b) by 180 days.

(21) Appl. No.: 10/001,304

(22) Filed: Nov. 2, 2001

(65) Prior Publication Data

US 2003/0103214 A1 Jun. 5, 2003

(51) Int. Cl.$^7$ ................................................. G01B 9/02
(52) U.S. Cl. ....................................................... 356/491
(58) Field of Search ................................ 356/491, 495, 356/492, 494

(56) References Cited

U.S. PATENT DOCUMENTS

| | | | |
|---|---|---|---|
| 3,985,447 A | 10/1976 | Aspnes | |
| 4,158,506 A | 6/1979 | Collett | |
| 4,286,843 A | 9/1981 | Reytblatt | |
| 4,310,247 A | 1/1982 | Korth et al. | |
| 4,681,450 A | 7/1987 | Azzam | |
| 4,887,899 A | * 12/1989 | Hung | 356/35.5 |
| 5,073,025 A | 12/1991 | Brooks | |
| 5,081,348 A | 1/1992 | Siddiqui | |
| 5,102,222 A | 4/1992 | Berger et al. | |
| 5,337,146 A | 8/1994 | Azzam | |
| 5,416,324 A | 5/1995 | Chun | |
| 5,502,567 A | 3/1996 | Pokrowsky et al. | |
| 6,075,235 A | 6/2000 | Chun | |
| 6,275,291 B1 | 8/2001 | Abraham et al. | |
| 6,304,330 B1 | * 10/2001 | Millerd et al. | 356/521 |

OTHER PUBLICATIONS

Berry, Gabrielse and Livingston, "Measurement of the Stokes Parameters of Light", Applied Optics, vol. 16, No. 12, Dec. 1977, pp. 3200–3205.

Chipman and Sornsin, "Mueller Matrix Imaging Polarimetry: An Overview", in Yoshizawa and Yokota (eds.), "Polarization Analysis and Applications to Device Technology", Proc. Soc. Photo–Opt. Instrum. Eng., vol. 2873, Jun. 1996, pp. 5–12.

Duggin, "Imaging Polarimetry in Scene Element Discrimination", in Goldstein and Chenault (eds.), "Polarization: Measurement, Analysis and Remote Sensing II", Proc. Soc. Photo–Opt. Instrum. Eng., vol. 3754, Jul. 1999, pp. 108–117.

Hauge, "Recent Developments in Instrumentation in Ellipsometry", Surface Science, vol. 96, Nos. 1–3, Jun. 1980, pp. 108–140.

(List continued on next page.)

*Primary Examiner*—Samuel A. Turner
*Assistant Examiner*—Patrick Connolly
(74) *Attorney, Agent, or Firm*—Birdwell, Janke & Durando, PLC

(57) ABSTRACT

A method and apparatus for instantaneous measurement of the complete state of polarization across an image. A polarimetric encoding scheme is employed to uniquely map the spatially-varying state of polarization across a partially-polarized image to irradiance variations in a polarization-encoded interference pattern. In one embodiment of the method, two spatially-varying retarders and a linear polarizer comprise an interferometric polarization interrogating filter assembly. When a conventional irradiance image is presented to the filter assembly, it is decomposed into polarized and unpolarized components. While the unpolarized component passes through the filter substantially unaffected, the polarized component gives rise to a polarization-encoded interference pattern that overlaps the scene so that local regions within the image having specific polarization content may be recognized. Discretization of the interference pattern by an array of electronic point detectors produces an electronic image from which the polarimetric parameters of interest may be calculated using a mathematical reconstruction algorithm.

37 Claims, 8 Drawing Sheets

OTHER PUBLICATIONS

Hauge, "Survey of Methods for the Complete Determination of a State of Polarization", Proc. Soc. Photo–Opt. Instrum. Eng., vol. 88, 1976, pp. 3–10.

Ohtsuka and Oka, "Contour Mapping of the Spatio–Temporal State of Polarization of Light", Applied Optics, vol. 33, No. 13, May 1994, pp. 2633–2636.

Schneider, "Polarized Life, Astronomers Probe Orion to Answer one of Life's Mysteries", Scientific American, vol. 279, No. 4, Oct. 1998, p. 24.

Shashar, Rutledge and Cronin, "Polarization Vision in Cuttlefish—A Concealed Communication Channel", The Journal of Experimental Biology, vol. 199, No. 9, Sep. 1996, pp. 2077–2084.

Tomkins, A User's Guide to Ellipsometry, Academic Presss, New York, 1993, pp. 19–34.

Walraven, "Polarization Imagery", Optical Engineering, vol. 20, No. 1, Jan. 1981, pp. 14–18.

Wehner, "Polarized–Light Navigation by insects", Scientific American, vol. 235, No. 1, Jul. 1976, pp. 106–115.

Azzam and Bashara, Ellipsometry and Polarized Light, Elsevier Science Publishers B.V., Amsterdam, 1989, pp. 55–59.

Born and Wolf, Principles of Optics, 7th Ed., Cambridge University Press, Cambridge, Eng., 1999, pp. 790–852.

Chipman, "Polarimetry", in M. Bass (ed.), Handbook of Optics, vol. 2, 2nd ed., Ch. 22, McGraw–Hill, New York, 1994, pp. 22.1–22.16.

Francon and Mallick, Polarization Interferometers, Wiley Series in Pure and Applied Optics, John Wiley and Sons Ltd., London, Eng., 1971, pp. 19–34.

Shurcliff, Polarized Light, Harvard University Press, Cambridge, Mass., 1962, pp. 1–14, pp. 109–123.

* cited by examiner

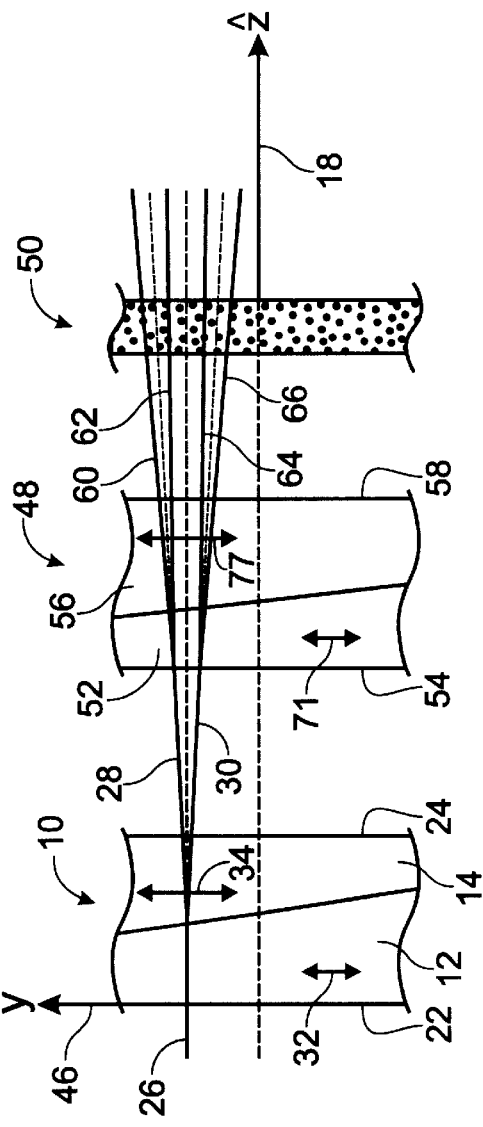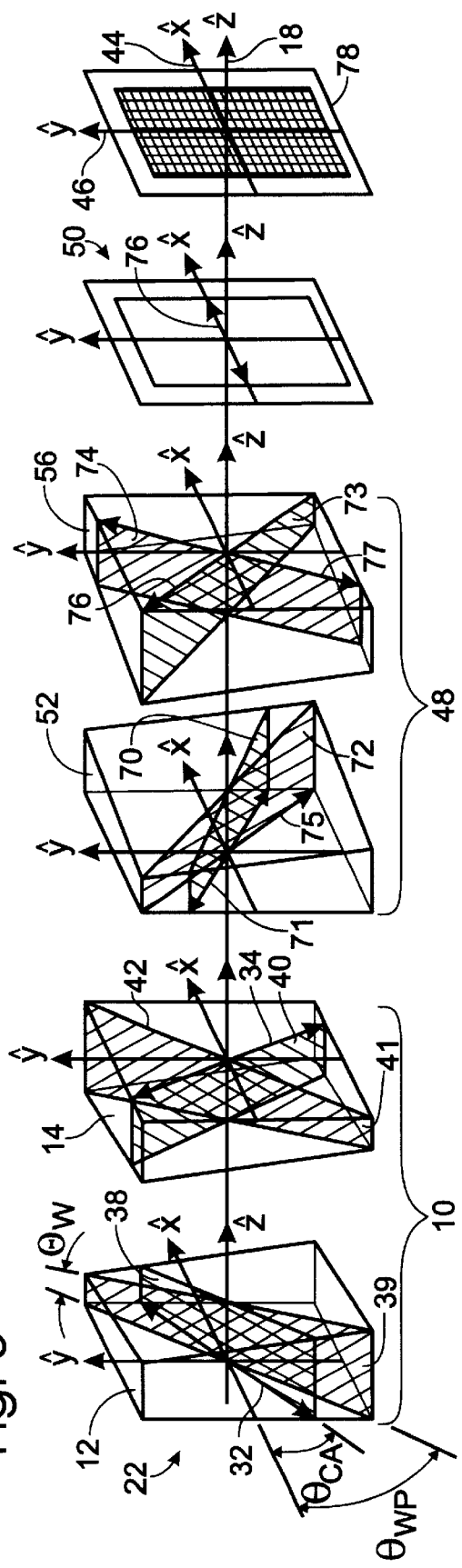
Fig. 5
Fig. 6

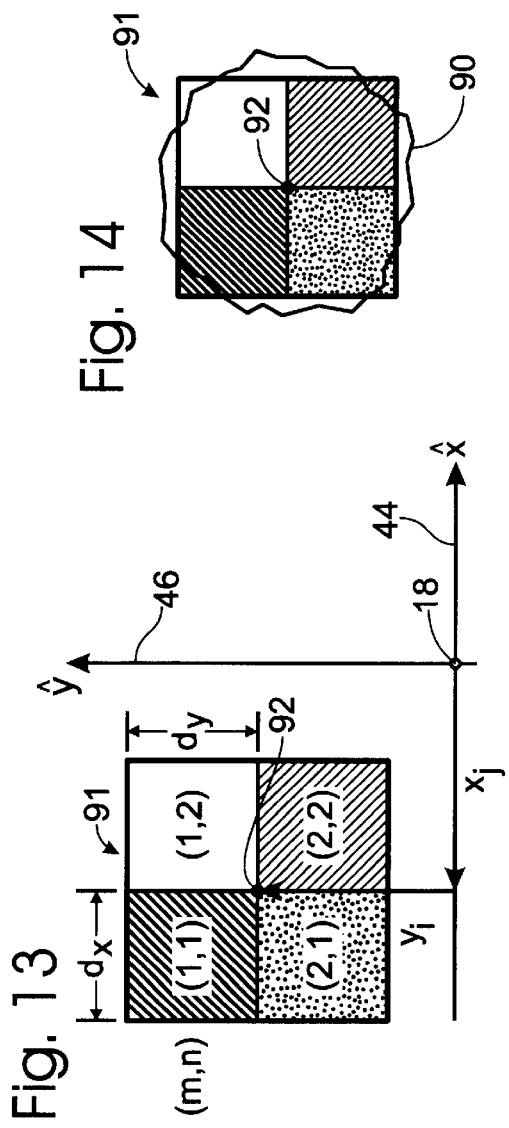
Fig. 13
Fig. 14
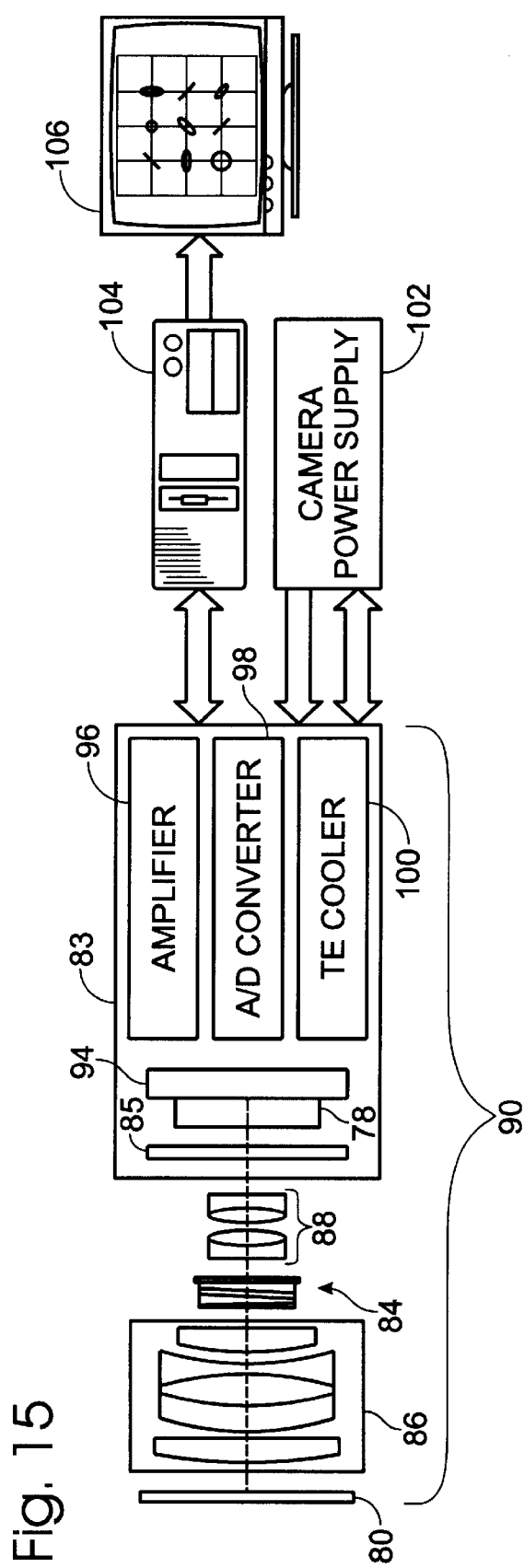
Fig. 15

INTERFEROMETRIC POLARIZATION INTERROGATING FILTER ASSEMBLY AND METHOD

BACKGROUND OF THE INVENTION

The present invention relates generally to polarimetric instrumentation and associated methods for measuring the state of polarization of a light beam, and more particularly to a novel interferometric polarization interrogating filter assembly and method for measuring the spatially-varying, complete state of polarization across an image comprised of one or more optical wavefronts in a no-moving-parts, instantaneous manner.

A single optical wavefront or a plurality of such wavefronts, i.e., a wavefront ensemble, may carry with it information pertaining to the state of polarization, spectral content, radiance distribution, coherence and statistical composition. Polarization encoding of the wavefront ensemble occurs when light interacts with material media. By decoding the spatially-varying state of polarization across a partially-polarized image, it is possible to acquire additional information beyond the conventional irradiance image that enables one to discern heretofore-indiscernible characteristics of the original object.

There is a great diversity of naturally occurring and human-engineered polarization encoding schemes or "polarization signatures" in the physical world.

In astronomy, for example, it has been found that certain preferred states of polarization result when celestial dust grains scatter light from nearby stars. Some scientists speculate that such preferences in the state of polarization could help to explain why most living organisms show an overwhelming preference toward right-handed sugars and left-handed amino acids in the building of their cellular structure. See, e.g., Schneider, "Polarized Life, Astronomers Probe Orion to Answer one of Life's Mysteries", *Scientific American*, Vol. 279, No. 4, October 1998, p. 24.

In the field of marine biology, it has been shown that certain cephalopods are sensitive to the azimuth of linearly polarized light by virtue of the orthogonal structure of photoreceptors in their retina. It has been further demonstrated that cuttlefish, i.e., *Sepia officinalis* L., communicate by using polarized light. See, e.g., Shashar, Rutledge and Cronin, "Polarization Vision in Cuttlefish—A Concealed Communication Channel", *The Journal of Experimental Biology*, Vol. 199, No. 9, September 1996, pp. 2077–2084.

Just as prolific, in the field of entomology, it has been shown that certain ants and bees use polarized sky light as a navigational compass. See, e.g., Wehner, "Polarized-Light Navigation by Insects", *Scientific American*, Vol.235, No.1, July 1976, pp. 106–115.

In the semiconductor industry, ellipsometry is used to measure film thickness, refractive index and other material properties. A light beam with a controlled state of polarization whose spectral content is well defined is made to illuminate a test surface. By measuring the change in the state of polarization of the reflected beam, certain information concerning mechanical and material properties of the test surface can be inferred. See, e.g., Tompkins, *A User's Guide to Ellipsometry*, Academic Press, New York, 1993.

Terrestrial resource mapping and surveillance investigations conducted via satellite are growing fields of study. Contrast enhanced polarization images of objects on the ground, as viewed from a low-flying satellite, can provide additional information to definitively identify those objects.

In fiber-optic components and systems employed in the telecommunications industry, signal polarization plays a crucial role. Accordingly, it is desirable to measure the state of polarization of a time-varying signal exiting from a single-mode fiber in an instantaneous manner.

In the military, polarization of light may be used to identify vehicles with friendly or hostile intent under less-than-ideal viewing conditions. Aircraft, for example, have quasi-specularly reflecting surfaces, which give rise to unique polarization signatures. See, e.g., Duggin, "Imaging Polarimetry in Scene Element Discriminatiorn", in Goldstein and Chenault (eds.), "Polarization: Measurement, Analysis and Remote Sensing II", *Proc. Soc. Photo-Opt. Instrum. Eng.*, Vol. 3754, July 1999, pp. 108–117.

Traditional approaches for measuring the state of polarization of an arbitrary wavefront ensemble include (1) discrete time-sequential, (2) continuous time-sequential, i.e., polarization-modulation, (3) division-of-amplitude, (4) division-of-aperture, and (5) interferometric methods. See, e.g., Hauge, "Survey of Methods for the Complete Determination of a State of Polarization", *Proc. Soc. Photo-Opt. Instrum. Eng.*, Vol. 88, 1976, pp. 3–10 and Hauge, "Recent Developments in Instrumentation in Ellipsometry", *Surface Science*, Vol. 96, Nos. 1–3, June 1980, pp. 108–140.

Whereas all of these approaches have been utilized in the past for measuring the complete state of polarization in a point context, few are amenable to measuring the complete state of polarization across an image. Difficulties often arise in practice that limit the general usefulness of such methods for imaging polarimetry applications.

Arguably, the most common approach for measuring the spatially-varying state of polarization across an image employs a discrete or continuous time-sequential measurement modality in which a certain amount of time is required in between each step of the measurement process.

In the discrete time-sequential case, a set of polarization interrogating elements, i.e., polarizers, retarders or combinations thereof, are inserted one-by-one into the wavefront ensemble of interest and image acquisition is repeated for each element of the set. At least four separate elements and their corresponding images are required to compute the complete state of polarization across a partially-polarized image.

Walraven is generally accredited for being the first investigator to employ discrete time-sequential measurement methods using a 35 mm film-based camera. In his work, the transmission axis of a linear polarizer was manually oriented at 0, 45, 90 and 135 degrees respectively between sequential exposures of the same scene. See, e.g., Walraven, "Polarization Imagery", *Optical Engineering*, Vol. 20, No. 1, January 1981, pp. 14–18. Although his work lacked determinacy with respect to the handedness of the polarization state across the image and his scene selection was severely restricted to static objects due to the time-sequential nature of his measurements, Walraven was successful in pointing out the importance of polarization image content.

In the continuous time-sequential case, one or more polarization interrogating elements are rotated in a continuous manner and the complete state of polarization is computed via Fourier analysis of the polarization-modulated signal. See, e.g., Berry, Gabrielse and Livingston, "Measurement of the Stokes Parameters of Light", *Applied Optics*, Vol. 16, No. 12, December 1977, pp. 3200–3205.

As described by Aspnes in U.S. Pat. No. 3,985,447 and elsewhere by Azzam and others, conventional ellipsometric instrumentation frequently employs a continuous time-sequential measurement approach in a point context. Accordingly, in order to measure spatial variations in surface properties the point is methodically scanned across the surface and an "image" of the desired property is constructed by mathematically "stitching" the data together. Such scanning methods and numerical processing techniques are inherently time consuming for high-resolution images.

In polarization component metrology, Chipman has successfully employed continuous time-sequential measurement methods to compute the spatially-varying polarimetric properties of various optical components. See, e.g., Chipman and Somsin, "Mueller Matrix Imaging Polarimetry: An Overview", in Yoshizawa and Yokota (eds.), "Polarization Analysis and Applications to Device Technology", *Proc. Soc. Photo-Opt. Instrum. Eng.*, Vol. 2873, June 1996, pp. 5–12.

More often than not, spatially-varying polarimetric properties of optical components do not vary as a function of time. In such cases, a time-sequential measurement approach is adequate for computing the polarimetric parameters of interest.

Both discrete and continuous time-sequential measurement methods allow for the complete measurement of the state of polarization in a point or imaging context. However, the nature of these approaches precludes them from being used for measuring wavefront ensembles whose polarization content changes rapidly in time. Although various electro-optic and magneto-optic means have been employed for speeding up the measurement process, time-sequential approaches are generally not applicable to the measurement of time-varying systems.

Division-of-amplitude is an alternative class of polarimeter instrumentation that allows for the complete measurement of the state of polarization in a no-moving-parts, instantaneous manner. However, such an approach is not amenable to an imaging context. As the name implies, division-of-amplitude instruments necessarily employ a splitting or dividing means whereby the incident wavefront ensemble under test is broken up into two or more beams. Each beam is then separately interrogated and detected in a simultaneous manner. For example, in U.S. Pat. No. 5,073,025, Brooks has utilized several non-polarizing beamsplitter cubes to divide an incident laser beam into six separate beams each with their own interrogating element and detector array. When carefully registered, the data comprising the six detector arrays enable one to compute a mapping of the state of polarization across the beam. Although this method has proven to be successful for testing well-collimated laser beams it would not be an acceptable approach for an imaging system of any useful angular field. A laser beam is often highly collimated making the registration process between the array detectors a simple matter. In an imaging context, over any practical angular field it is exceedingly difficult to keep the detector arrays in precise registration across the field.

Azzam has made several contributions to division-of-amplitude point polarimeter instrumentation. Most notable are his four-detector photopolarimeter, U.S. Pat. No. 4,681,450, and diffraction-grating photopolarimeter, U.S. Pat. No. 5,337,146. Both approaches are quite amenable to a well-collimated input beam. However, neither affords any real practical use in imaging polarimeter instrumentation.

Apart from the difficulty of multiple detector array registration, in a division-of-amplitude imaging polarimeter there is great redundancy of imaging system components and electronic circuitry required. Such redundancy can be expensive, fragile in nature and restrictive in certain applications. For example, in space-borne imaging polarimeter instrumentation such an approach necessarily increases on-board electrical power consumption.

Division-of-aperture allows the instantaneous measurement of the complete state of polarization in both quasi-point and imaging applications. Collett in U.S. Pat. No. 4,158,506 describes how a "polarizer assembly" comprised of a discrete array of six polarization interrogating elements positioned in front of a "six element optical detector assembly" allows the complete state of polarization to be determined for laser pulses in an instantaneous manner. Taking this a step further, in U.S. Pat. No. 5,416,324, Chun has superposed a discrete micro-array of polarization interrogating elements onto the detector array surface so that all of the polarization information can be acquired across an image in an instantaneous manner. This measurement scheme requires extremely precise registration between the discrete elements comprising the polarization interrogating array and the picture elements, i.e., pixels, comprising the detector array. Such registration becomes exceedingly difficult as the pixels become smaller in size and larger in number as in the case of modern digital imaging instrumentation. Furthermore, such an approach is detector-specific in that the array of polarization interrogating filter elements can only be used with that detector geometry for which it was specifically designed.

It is commonly known that interferometers provide extremely sensitive means for determining a measurand of interest. It is this same heightened sensitivity that makes them susceptible to temperature, vibration and other deleterious effects that may have contributed to the lack of interest in employing interferometric methods for polarization measurement. As a result, interferometric approaches to polarization measurement are the least commonly employed among the various measurement schemes.

In an unusual point-polarimeter embodiment, Korth and Schedewie describe an interferometric approach for measuring the state of polarization in their U.S. Pat. No. 4,310,247. However, their approach is not applicable to an imaging context where the state of polarization can vary from point-to-point across the image. Nor is it possible to compute, from the interference pattern generated, the Stokes parameters as a function of position across the incident wavefront ensemble. The apparatus described by Korth and Schedewie does not provide a unique mapping. For example, one cannot differentiate between linear states of horizontal and vertical orientation. Both states result in the same null condition of zero fringe visibility.

Ohtsuka and Oka have described a means for mapping the spatially-varying state of polarization across an image using an interferometric method. See, e.g., Ohtsuka and Oka, "Contour Mapping of the Spatio-Temporal State of Polarization of Light", *Applied Optics*, Vol. 33, No. 13, May 1994, pp. 2633–2636. However, their approach makes use of a non-common-path Mach-Zehnder interferometer that is highly sensitive to temperature and vibration effects to rendering it difficult to use outside of a controlled laboratory environment. In addition, their instrument requires the wavefront ensemble of interest to have a high degree of temporal and spatial coherence thus limiting the usefulness of the approach to quasi-monochromatic, well-collimated, coherent, wave fields.

Accordingly, there is a pronounced need for a new method of polarization measurement that is (1) amenable to an imaging context, and (2) allows instantaneous measurement of the spatially-varying, complete state of polarization across an image in a no-moving-parts, easily-deployed, robust manner.

SUMMARY OF THE INVENTION

The aforementioned need is fulfilled in the present invention by providing (1) a novel method by which polarization information contained within an arbitrary wavefront ensemble is uniquely encoded within an interference pattern, (2) a novel interferometric polarization interrogating filter assembly that produces a polarization-encoded interference pattern representative of the spatially-varying, complete state of polarization across the ensemble, and (3) a novel mathematical reconstruction algorithm for decoding the polarimetric parameters of interest from the electronic image produced by detector array discretization of the polarization-encoded interference pattern.

Novelty of the method described herein resides in the interferometric approach to polarization measurement whereby the spatially-varying, complete state of polarization across an image comprised of a plurality of optical wavefronts is uniquely mapped to irradiance variations in an interference pattern. This mapping or polarization-encoding process produces a unique irradiance fringe system for any input state of polarization. Local variations in the state of s polarization across an image result in corresponding local variations in the irradiance fringe system.

The new method consists of a novel combination of three separate operations. The first operation employs a first retardation-gradient encoding scheme across the incident wavefront ensemble of interest. The second operation employs a second retardation-gradient encoding scheme whose direction is orthogonal to the first. The third operation employs a polarizer to preferentially pass certain components of the now doubly retardation-encoded wavefront ensemble to facilitate the formation of a polarization-encoded interference pattern.

A preferred embodiment of the novel method is realized by a novel interferometric polarization interrogating filter assembly herein referred to as an Ortho-Babinet Polarization Interrogating ("OBPI") filter. During use, an ensemble of electromagnetic wavefronts comprising a partially-polarized image is directed through the OBPI filter assembly. The resulting polarization-encoded image exiting the filter consists of an interference pattern superposed over the original input image. Only the polarized portion of the partially-polarized image gives rise to interference fringes. The unpolarized portion of the input image passes through the OBPI filter assembly substantially unaffected. The structure of the interference pattern contained within the polarization-encoded output image allows the spatially-varying, complete state of polarization to be determined across the input image in a point-by-point, no-moving-parts, instantaneous manner thereby enhancing the ability to discern heretofore-indiscernible characteristics of the original object.

The OBPI filter assembly employs a novel combination of three stages to produce a polarization-encoded interference pattern. Each stage of the filter performs one of the operations in the method. In the first stage of the OBPI filter assembly, the input image is split into two orthogonally polarized secondary eigen-images and one eigen-image is retarded relative to the other in a controlled, deterministic, spatially-varying manner by what will be called a first modified Babinet system. In the second stage, each secondary eigen-image is further split into two orthogonally polarized tertiary eigen-images and one eigen-image is retarded relative to the other in a controlled, deterministic, spatially-varying manner by what will be called a second modified Babinet system. In the third stage, a polarizer preferentially passes that component of each tertiary eigen-image that is substantially identical to the major eigenpolarization state of the polarizer, thus allowing the four tertiary eigen-images to interfere. The resulting polarization-encoded interference pattern identifies the complete state of polarization across the original partially-polarized image.

In a quantitative embodiment of the invention described herein, an electronic detector array performs a spatial discretization of the continuous interference pattern generated by the OBPI filter. Analog-to-digital conversion of the pixel illumination levels contained within the electronic image provides a set of raw data. Applying a novel mathematical reconstruction algorithm to the data allows for the computation of the polarimetric parameters of interest, i.e., the Stokes parameters, across the image in a no-moving-parts instantaneous manner.

It is therefore a principal object of the present invention to provide a novel D interferometric polarization measurement method by which polarization information contained within an arbitrary wavefront ensemble of interest is uniquely encoded within an interference pattern.

It is another object of the present invention to provide a novel interferometric polarization interrogating filter assembly that produces a polarization-encoded interference pattern uniquely representative of the spatially-varying, complete state of polarization across some arbitrary wavefront ensemble of interest.

It is a further object of the present invention to provide a novel mathematical reconstruction algorithm for decoding the polarimetric parameters of interest from the electronic image produced by detector array discretization of the polarization-encoded interference pattern.

It is a final object of the present invention to provide a system for simultaneously measuring all four Stokes parameters across an image comprised of a plurality of optical wavefronts in a no-moving-parts, instantaneous manner.

The imaging polarimeter instrument made possible by the method and assembly described herein has at least the following advantages over the prior art:

1. It is a complete polarimeter capable of simultaneously measuring all four Stokes parameters and hence the most general state of partial polarization across the image.
2. It requires no moving parts and measures the complete state of polarization instantaneously in a non-time-sequential manner.
3. It is a passive assembly that requires no additional electrical power besides that necessary to operate a single detector array and its associated electronic circuitry.
4. It can be employed over a substantial wavelength region of interest from the ultraviolet to the far infrared limited only by detection interrogating means.
5. It employs an internal polarization-encoding scheme that is completely independent of the dimensions and geometry of the detector array and, therefore, may be used with virtually any detector geometry.
6. It may be easily incorporated into preexisting conventional imaging instrumentation in one of several, non-permanent, ways.
7. It can be used, with suitable spectral interrogating means, as part of an imaging spectro-polarimeter instrument.

8. It is compatible with micro-lenses directly deposited onto individual pixel elements of the detector array to increase its fill factor.
9. It is compatible with interlaced color filter arrays utilized in digital color photography.
10. It can be used for both imaging polarimeters and point polarimeters.
11. It can be used by a trained observer to discern local variations in the state of polarization throughout a scene with the unaided eye.
12. It is straightforward to manufacture.
13. It requires no precise registration relative to the detector array provided that its orientation is held constant during calibration and image acquisition.
14. It may comprise a single, optically-bonded, assembly that is robust and insensitive to mechanical vibrations and temperature effects thereby being compatible with a hostile operating environment.
15. It can be used with narrowband or broadband light.
16. It may be mechanically small and minimally intrusive to preexisting imaging instrumentation.
17. It does not disturb the careful balance of aberration correction in preexisting imaging instrumentation.
18. It employs a novel reconstruction algorithm whose mathematical architecture enables computing the polarization parameters of interest in a quasi-real-time fashion.
19. It presents the same state of polarization to each pixel in the detector array regardless of the incident test wavefront ensemble and thus eliminates detector polarization sensitivity.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 5 is a projected view of the three fundamental stages comprising an OBPI filter assembly according to the principles of the present invention as seen in the ŷ-ẑ plane.

FIG. 6 is a perspective exploded view of an OBPI filter assembly according to the present invention followed by a two-dimensional array of electronic point detectors.

FIG. 13 illustrates the minimum spatially resolved polarization picture element or "unit cell" in the detector array.

FIG. 14 illustrates a "polarization domain" superposed over a unit cell.

FIG. 15 illustrates a low-noise, scientific-grade, quantitative embodiment of an imaging polarimeter instrument employing the OBPI filter assembly according to the present invention.

DETAILED DESCRIPTION OF THE INVENTION

1. Overview

Figure 1:
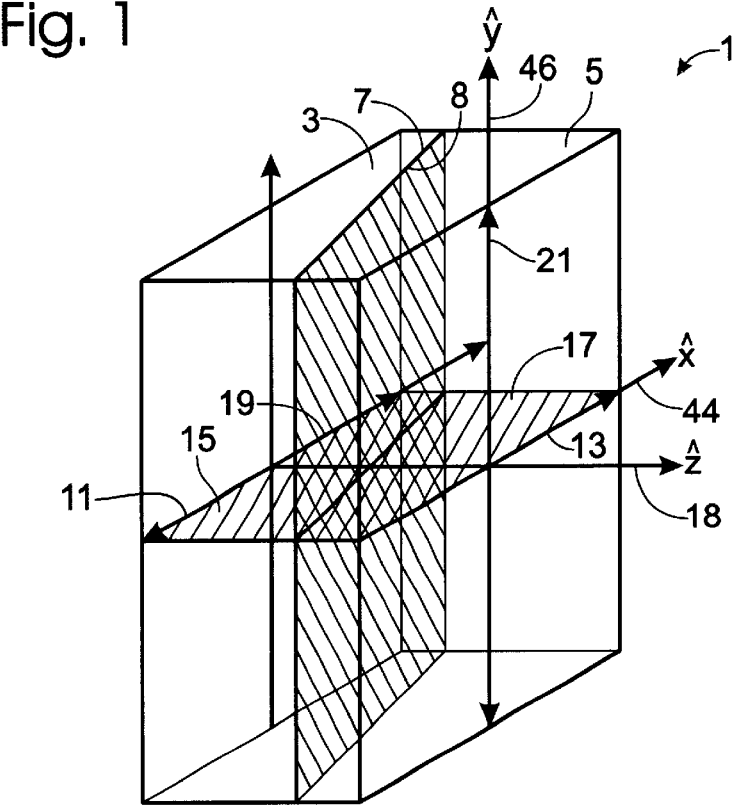
FIG. 1 illustrates a conventional Babinet system according to the prior art.

In the broadest sense, the invention described herein represents a novel interferometric polarization measurement method whereby a polarization-interrogating filter produces an interference pattern that is representative of the transverse distribution of polarization across some optical wavefront ensemble of interest. The filter referred to herein shall be called an Ortho-Babinet Polarization Interrogating ("OBPI") filter. The OBPI filter uniquely encodes the input wavefront ensemble in a controlled, deterministic manner so as to map the spatially-varying, complete state of polarization across the ensemble to variations in an irradiance fringe system or interferogram.

The interference pattern can be qualitatively viewed with the unaided eye, or quantitatively interrogated with a two-dimensional array of electronic point detectors. In the latter case, the detector array spatially and temporally integrates the total illumination incident upon each detector element of the array so as to produce a measurable electronic response that is characteristic of that illumination level. As such, the detector array serves to spatially discretize the continuous variation of irradiance in the interference pattern generated by the OBPI filter. This discretization process results in a set of raw data from which one may compute the spatially-varying polarimetric parameters of interest. Applying a novel mathematical reconstruction algorithm to the data contained in a single digitized image enables one to simultaneously compute, on a point-by-point basis, all four Stokes parameters across the incident wavefront ensemble in a no-moving-parts, instantaneous manner.

If the aforementioned wavefront ensemble corresponds to an image of some distant object of interest, then by measuring variations in the state of polarization across the image, additional information about the original object may be inferred, thereby enhancing discrimination between that object and some other similar object.

The invention described herein essentially employs a novel combination of three fundamental stages to produce the polarization-encoded interference pattern. To help describe these stages, the concept of a "ray" will be used whose state of polarization is representative of that specific wavefront whose surface normal is collinear with the "ray" in question. One skilled in the art will recognize that within arbitrarily oriented birefringent media, the wavevector, i.e., wavefront surface normal, may not be parallel to the Poynting vector, i.e., direction of energy flow. Within such anisotropic media, we will associate a "ray" with that direction given by the Poynting vector. Consequently, a ray may or may not be precisely normal to the wavefront in question depending on the nature of the material being traversed. For purposes of this application, these intricacies can be neglected so that the ray is considered normal, or very nearly normal, to the wavefront at all times and its state of polarization is representative of the state of polarization of that corresponding wavefront. Being an interferometer, the invention described herein requires careful accounting of the various optical paths traversed in the system. The concept of a "ray" facilitates this accounting procedure. By considering the behavior of the OBPI filter assembly for a single ray entering the system, it will be shown that the OBPI filter functions as a four-beam, common-path, interferometer.

In the first stage, an arbitrarily polarized, primary ray is split, i.e., doubly refracted, into two orthogonally polarized, secondary "eigen-rays", such that the optical path length of the first secondary eigen-ray is retarded or advanced relative to the optical path length of the second secondary eigen-ray. The secondary eigen-rays are caused to have an optical path length difference ("OPD") that depends linearly on the transverse location of the entry point for the incident primary ray. This is accomplished by directing the primary ray into a first modified Babinet system.

In the second stage, each secondary eigen-ray is further divided, i.e., doubly refracted, into two orthogonally polarized, tertiary eigen-rays, such that, for each secondary eigen-ray, the optical path length of the first tertiary eigen-ray is retarded or advanced relative to the optical path length of the second tertiary eigen-ray. Each pair of tertiary eigen-rays is caused to have an OPD that depends linearly on the transverse location of the entry point for each corresponding to secondary eigen-ray. This is accomplished by directing the secondary eigen-rays into a second modified Babinet system. The four tertiary eigen-rays that result represent the "beams" in what could be called a four-beam interferometer.

In the third and final stage, all of the four tertiary eigen-rays pass through a polarizer that enables their corresponding wavefronts to interfere, thereby producing the desired polarization-encoded irradiance fringe system.

For any single primary ray and its associated primary wavefront, the resulting four tertiary rays and their associated tertiary wavefronts will be spatially coherent with non-localized irradiance fringes resulting. For a plurality of primary rays, constituting a variety of differing angles of incidence, each similarly polarized primary ray and its associated primary wavefront will give rise to the same irradiance fringe system. However, these individual fringe systems will partially overlap one another thus resulting in a total irradiance fringe system that is localized. Provided that the angles of incidence of the primary rays entering the OBPI filter are not too great, the fringe visibility in the total irradiance fringe system is negligibly reduced and polariretric content of the input wavefront ensemble can be computed.

For purposes of this application, a plurality of identically polarized "eigen-rays" and their associated "eigen-waves" shall be equivalently referred to herein as an "eigen-image".

2. The Conventional Babinet System

Referring to FIG. 1, a conventional Babinet system is a refracting optical assembly 1 commonly comprised of two wedges 3 and 5 of identical wedge angle fashioned from the same uniaxial, linearly birefringent material.

When placed side-by-side with their respective wedge faces 7 and 8 immediately adjacent to each other and their wedge axes 11 and 13 and wedge planes 15 and 17 antiparallel and coplanar respectively, the combination resembles a plane parallel plate. In the first wedge 3 of the conventional Babinet system, the crystal axis 19 is parallel (or perpendicular) to the wedge plane 15. Conversely, in the second wedge 5 of the conventional Babinet system, the crystal axis 21 is perpendicular (or parallel) to the wedge plane 17. Consequently, after assembly the two crystal axes 19 and 21 are perpendicular to each other, parallel to the exterior faces of the resulting plane parallel plate, and "coupled," i.e., parallel or perpendicular, to the common wedge plane that defines a characteristic OPD gradient direction.

3. The Modified Babinet System

In the preferred embodiment of the invention, the splitting of an arbitrarily polarized incident ray into two orthogonally polarized eigen-rays is accomplished by what is referred to herein as a modified Babinet system. The conventional Babinet system is modified in the sense that the crystal axis, defined in each wedge of the assembly, is neither parallel nor perpendicular to the common wedge plane. This modification effectively "decouples" the OPD gradient direction from the orientation of the crystal axes in the conventional Babinet system.

Figure 2:
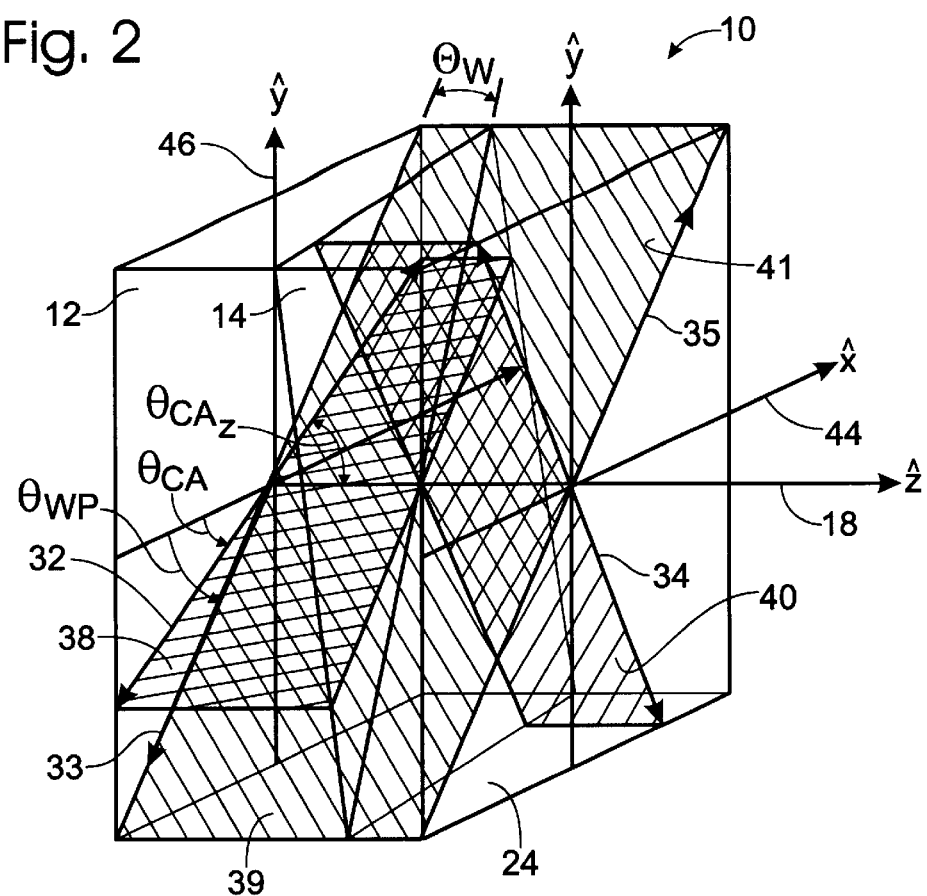
FIG. 2 illustrates a modified Babinet system according to the present invention.

Referring to FIG. 2, the modified Babinet system 10 comprises a first wedge 12 made of birefringent crystalline material whose surface normals reside in a first wedge plane 39 and a second wedge 14 made of birefringent crystalline material whose surface normals reside in a second wedge plane 41. The crystal axis 32 of the first wedge 12 and the $\hat{z}$ axis 18 define a first crystal axis plane 38. The crystal axis 34 of the second wedge 14 and the $\hat{z}$ axis 18 define a second crystal axis plane 40. First wedge plane 39 and second wedge plane 41 are coplanar. First wedge axis 33 and second wedge axis 35 are anti-parallel. First crystal axis plane 38 and second crystal axis plane 40 are distinct and rotationally offset from one another by 90 degrees. To facilitate the use of a modified Babinet system in the present invention, the second crystal axis plane 40 must be perpendicular to the first crystal axis plane 38, and the common wedge planes 39 and 41 must not be coplanar with either of the crystal axis planes.

Figure 3:
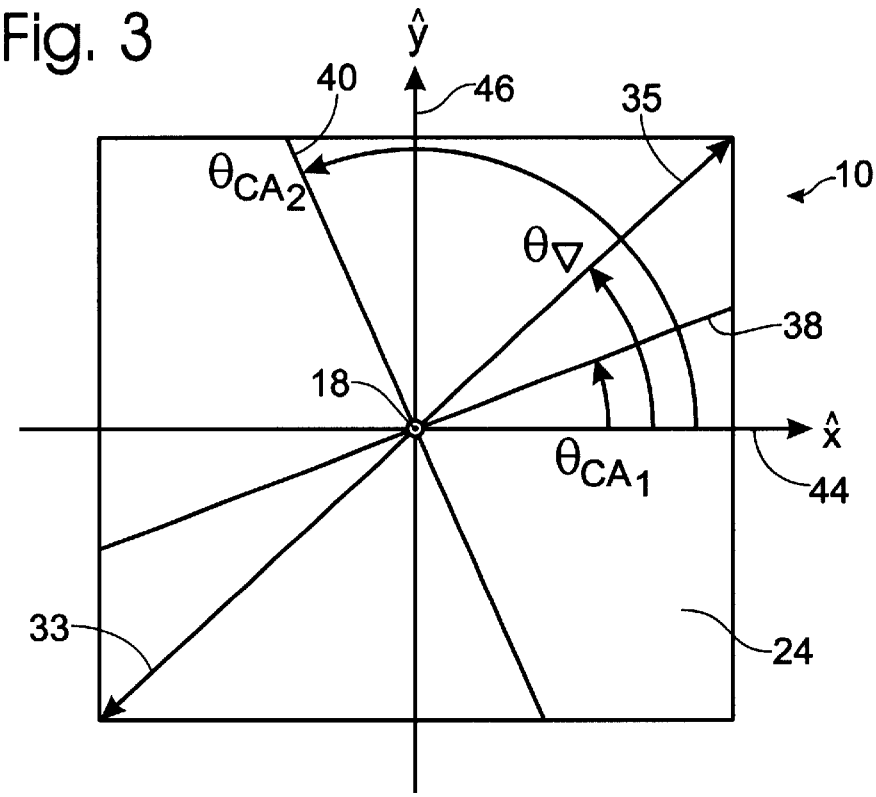
FIG. 3 is an end view of the modified Babinet system illustrated in FIG. 2.

Referring to FIG. 3, which is an end view of exit face 24 of the modified Babinet system 10, the crystal axis plane 38 of the first wedge 12 is rotated 90 degrees with respect to the crystal axis plane 40 of the second wedge 14. The wedge plane 39 of the first wedge 12 is coplanar with the wedge plane 41 of the second wedge 14 such that the wedge axis 33 of the first wedge 12 is anti-parallel to the wedge axis 35 of the second wedge 14. By convention, the azimuthal orientation of the crystal axis planes and wedge planes are measured in a counterclockwise direction relative to the $\hat{x}$ axis 44 of a right-handed Cartesian coordinate system, in which the $\hat{z}$ axis 18 and $\hat{y}$ axis 46 represent the other two orthogonal directions.

Figure 4:
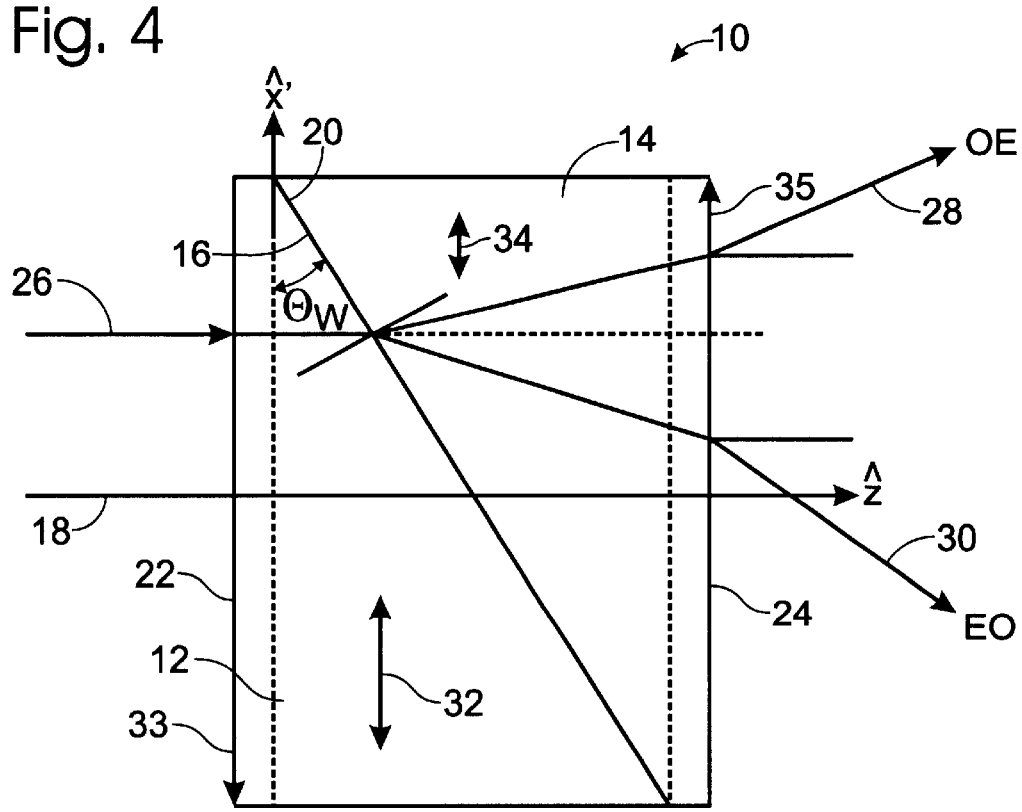
FIG. 4 is a projected view of the modified Babinet system as seen in the common wedge plane.

FIG. 4 is a projection of FIG. 2 as viewed in the common wedge plane indicating face 16 of the first wedge 12 being inclined to the mechanical centerline axis 18 and further disposed immediately adjacent the face 20 of the second wedge 14 which is likewise so inclined. Ordinarily, but not necessarily, first wedge 12 and second wedge 14 would be made of the same birefringent material and identically shaped, i.e., same wedge angle $\Theta_w$. The mechanical centerline axis 18 is the reference axis of propagation of light for the purpose of understanding the invention and is also referred to as the "$\hat{z}$ axis" of the aforementioned Cartesian coordinate system. The term "wedge face" is used herein to refer to the face of a wedge that is inclined to the $\hat{z}$ axis. First wedge 12 has an entrance face 22 normal to the $\hat{z}$ axis and a wedge face 16. Second wedge 14 has an exit face 24 normal to the $\hat{z}$ axis and a wedge face 20.

Where, as in the particular embodiment of the invention, the crystal axis 32 of the first uniaxial, linearly birefringent wedge 12 is oriented normal to the $\hat{z}$ axis 18, and a primary ray 26 enters the system normal to the entrance face 22, the primary ray is subsequently decomposed by the first wedge 12 into two collinear, orthogonally polarized secondary eigen-rays; an ordinary (O) secondary eigen-ray and an extraordinary (E) secondary eigen-ray. At the interface formed by wedge face 16 and wedge face 20, because of the orthogonal nature of the crystal axis planes, the collinear secondary eigen-rays are refracted in diverging directions. The ordinary eigen-ray in the first prism 12 becomes an extraordinary eigen-ray in the second prism 14; herein labeled OE eigen-ray 28 in FIG. 4. Also, the extraordinary eigen-ray in the first prism 12 becomes an ordinary eigen-ray in the second prism 14; herein labeled EO eigen-ray 30 in FIG. 4.

For identically shaped wedges of the same birefringent crystalline material, when the secondary eigen-rays emerge from the modified Babinet system, OE eigen-ray 28 and EO eigen-ray 30 have accumulated an OPD that is linearly proportional to the distance between the mechanical centerline or $\hat{z}$ axis 18 and the point of entry for the primary ray 26 measured along the common wedge plane. In the small angle approximation, if the primary ray 26 enters entrance face 22 along the mechanical centerline axis 18, the optical path length of OE eigen-ray 28 will be equal to the optical path length of EO eigen-ray 30. The resulting OPD is zero and the eigen-waves corresponding to these eigen-rays will consequently be "in phase" upon exiting the modified Babinet system. However, a primary ray 26 that enters the entrance face 22 of the modified Babinet system 10 at any other position will produce secondary eigen-rays that emerge from exit face 24 with a non-zero optical path length difference. The corresponding eigen-waves will consequently be "out of phase". In this manner, the optical path length difference is dependent on the lateral position within the aperture of the modified Babinet system, thereby ok resulting in a phase-retardation-gradient encoding scheme where the OPD gradient direction ("$\theta_\nabla$") lies outside of either crystal axis plane ("$\theta_{CA_1}$" and "$\theta_{CA_2}$"). Because the crystal axis planes are no longer "coupled" to the OPD gradient direction, the modified Babinet system is functionally equivalent to a spatially-varying retarder whose fast axis can be arbitrarily oriented. This subtle yet important aspect of the modified Babinet system facilitates its use in the construction of an OBPI filter.

An arbitrary wavefront entering the modified Babinet system 10 could be obliquely incident upon entrance face 22. The corresponding obliquely incident primary ray 26 would necessarily experience double refraction at the entrance face 22 of the modified Babinet system 10, such that OE eigen-ray 28 and EO eigen-ray 30 diverge immediately upon refraction into the first wedge 12. While they may be further refracted from their respective paths at the wedge interface, OE eigen-ray 28 and EO eigen-ray 30 will not be further split because of their polarization content relative to the crystal axis planes of the modified Babinet system. Upon exiting the system, OE eigen-ray 28 and EO eigen-ray 30 and their associated eigen-waves will have experienced the required phase-retardation-gradient encoding scheme.

Although FIG. 4 has been drawn for a positive uniaxial crystalline material, it is to be recognized that a negative uniaxial or biaxial crystalline material can also be employed to produce the required phase-retardation-gradient encoding scheme.

4. The OBPI Filter Assembly

The interferometric polarization interrogating filter assembly of the present invention, that is, the OBPI filter, comprises two modified Babinet systems, that is, spatially-varying retarders, and a polarizer, as shown in FIGS. 5 and 6.

FIG. 5 is a projection of the OBPI filter as viewed in the $\hat{y}$-$\hat{z}$ plane illustrating the three fundamental stages of the assembly. A primary ray 26 incident upon entrance face 22 of the first modified Babinet system 10 gives rise to secondary eigen-rays 28 and 30 emerging from exit face 24 further incident upon entrance face 54 of a second modified Babinet system 48 comprising a first wedge 52 and second wedge 56. The second modified Babinet system 48 is identical in principle to the first modified Babinet system 10, except for the orientation of its wedge planes and crystal axis planes. Like the first modified Babinet system 10, the second modified Babinet system 48 splits each of the incident secondary eigen-rays 28 and 30 into a respective pair of tertiary eigen-rays. The resulting four tertiary eigen-rays 60, 62, 64 and 66 emerging from exit face 58 of the second modified Babinet system 48 enter a polarizer 50, which passes only that component of each tertiary eigen-ray that is common to its major eigenpolarization state. Each of the four tertiary eigen-rays has an associated eigen-wave whose wave normal, i.e., wavevector, direction is collinear with the corresponding eigen-ray. After passing through polarizer 50, each of the associated eigen-waves is identically polarized. The interference of the four eigen-waves results in a characteristic polarization-encoded irradiance fringe system that is dependent upon the state of polarization of the original primary ray 26. Ordinarily, but not necessarily, the polarizer 50 is a linear polarizer, which passes only those electric field components of the four tertiary eigen-rays 60, 62, 64 and 66 that are parallel to the transmission axis of the polarizer.

It is to be recognized that, while FIG. 5 has been drawn to show the diverging paths of the tertiary eigen-rays 60, 62, 64 and 66, the angles between these rays are actually very small. This is because the magnitude of the wedge angles comprising the first and second modified Babinet systems is small. As the thickness of the OBPI filter assembly is reduced, in the small angle approximation, the four tertiary eigen-rays 60, 62, 64 and 66 can be considered nearly collinear and collectively emerging from a point that is a rectilinear projection of principal ray 26 onto polarizer 50.

It is to be further recognized in FIG. 5 that, crystal axis 32 of first wedge 12 and crystal axis 34 of second wedge 14 comprising a first modified Babinet system 10 and crystal axis 71 of first wedge 52 and crystal axis 77 of second wedge 56 comprising a second modified Babinet system 48 all lie outside the plane of the figure.

Referring to FIG. 6, in a manner similar to that which describes the first modified Babinet system 10, a first wedge 52 of the second modified Babinet system 48 contains a first crystal axis 71, a first crystal axis plane 70 and a first wedge plane 72. A second wedge 56 of the second modified Babinet system 48 contains a second crystal axis 77, a second crystal axis plane 74 that is rotated 90 degrees from the first crystal axis plane 70 and a second wedge plane 73 that is coplanar with the first wedge plane 72 such that wedge axes 75 and 76 are anti-parallel. Coplanar wedge planes 39 and 41 in the first modified Babinet system 10 and coplanar wedge planes 72 and 73 in the second modified Babinet system 48 are rotationally offset from one another by 90 degrees. Because of the orthogonal nature of these coplanar wedge plane pairs, the term "Ortho-Babinet Polarization Interrogating", or OBPI, filter has been coined for convenience and is used herein as stated above. A necessary requirement for the OBPI filter is that none of the crystal axis planes 38, 40, 70 and 74 are coplanar with one another nor can they be coplanar with any of the wedge planes 39, 41, 72 and 73. Moreover, the transmission axis 76 of linear polarizer 50, along which electric field components of the four tertiary eigen-rays 60, 62, 64 and 66 are passed, cannot be parallel to any crystal axis plane 38, 40, 70 and 74.

After passing through polarizer 50, all of the aforementioned eigen-rays 60, 62, 64 and 66 are identically polarized. As such, their corresponding eigen-waves interfere with one another, forming a unique, non-localized, irradiance fringe system that is characteristic of the state of polarization of the original primary ray 26.

Should an ensemble of arbitrarily polarized wavefronts with largely varying wave normal directions be incident upon entrance face 22, the resulting total irradiance fringe system will be localized. In the visible spectrum, this irradiance fringe system, localized or not, can be qualitatively observed by the unaided human eye. Preferably however, the OBPI filter is employed in a quantitative imaging system whereby the continuous polarization-encoded interference pattern is discretized by a two-dimensional array of electronic point detectors 78 and further digitized for computer interpretation.

In the particular embodiment shown in FIG. 6, the OBPI filter assembly comprises four uniaxial, linearly birefringent wedges and a linear polarizer. $\theta_W$ denotes the magnitude of the wedge angle. $\theta_{WP}$ and $\theta_{CA}$ denote respectively the azimuthal orientation of the wedge plane and crystal axis plane measured in a counterclockwise ("ccw") direction from the $\hat{x}$ axis. $\theta_{CA_z}$ denotes the angle between the crystal axis and $\hat{z}$ axis measured in the crystal axis plane of each wedge. And, $\theta_{TA}$ denotes the transmission axis of the linear polarizer.

In one specific embodiment of the invention the transmission axis of the linear polarizer is aligned along the $\hat{x}$ axis, i.e., horizontally. The magnitude of the wedge angles, orientation of the wedge and crystal axis planes and direction of the crystal axes in degrees are given by:

|  | Wedge 12 | Wedge 14 | Wedge 52 | Wedge 56 |
|---|---|---|---|---|
| $\theta_W$ | 1.429 | 1.429 | 1.429 | 1.429 |
| $\theta_{WP}$ | 45 | 225 | 135 | 315 |
| $\theta_{CA}$ | 30 | 120 | 150 | 60 |
| $\theta_{CAz}$ | 90 | 90 | 90 | 90 |

Ordinarily, but not necessarily, wedges 12, 14, 52 and 56, of the OBPI filter assembly are identically shaped. Ordinarily, but not necessarily, wedges 12, 14, 52 and 56 are fabricated from the same material. Ordinarily, but not necessarily, wedges 12, 14, 52 and 56 are fabricated from a class of uniaxial, linearly birefringent anisotropic material. Ordinarily, but not necessarily, crystal axes 32, 34, 71 and 77 are perpendicular to the $\hat{z}$ axis. Ordinarily, but not necessarily, the polarizer 50 is a linear polarizer.

It should be realized by those skilled in the art that the particular embodiments shown in FIGS. 5 and 6 represent only one of an infinite number of possible embodiments for the OBPI filter assembly. Many different embodiments of the filter, that is, embodiments having different crystal axis orientations, material choices, wedge magnitude and directions, and the like, may be constructed. Practically speaking, consideration of certain key construction parameters leads to a reduced number of efficiently manufacturable filters. For example, different axis orientations may be employed in the construction of an OBPI filter that facilitate its fabrication with only minor consequences to the reconstruction algorithm.

Various alternative embodiments of the OBPI filter may be evident to those skilled in the art, which enable one to accentuate measurement range or resolution of a particular measurand of interest. In other words, the design of the OBPI filter can be optimized for the intended application. For example, achromatizing methods may be employed in order to reduce the effects of material dispersion in the birefringent wedges of the OBPI filter, thus precluding the need for quasi-monochromatic light.

Construction methodology of the OBPI filter could possibly make use of a variety of novel, nano-engineered materials and structures. For example, one might wish to employ form-birefringent thin film wedges in each of the modified Babinet systems comprising the filter. Alternatively, one could contemplate the use of bireflingent liquid crystal materials that would allow electronic addressing of the fringe system should the need arise. In a similar manner, one may consider the use of form-dichroic or Hertzian wire-grid structures to perform the polarizer function. Whatever the specific mechanical construction parameters may be, the disposition of the various elements of the OBPI filter assembly allow for a unique interference pattern to be generated for any given state of polarization input.

5. Polarization-encoded Irradiance Fringe Systems

The OBPI filter is a common-path four-beam interferometer whose resulting interference pattern, or irradiance fringe system, is virtually equivalent to that obtained by interfering four coherent, identically polarized point sources. The irradiance fringe system generated by the OBPI filter of the present invention may take a variety of distinct forms depending on the specific construction parameters of the filter assembly and the state of polarization and spectral content of the incident wavefront ensemble under test. The most important feature of the resulting fringe system is that a unique interferogram is generated for each specific state of polarization input. In other words, there is a unique mapping from the input state of polarization to the output fringe system. It is this unique mapping scheme that enables the OBPI filter to make possible a complete imaging polarimeter instrument capable of simultaneously measuring all four Stokes parameters across some wavefront ensemble of interest in a no-moving-parts, instantaneous manner.

Figure 7A:
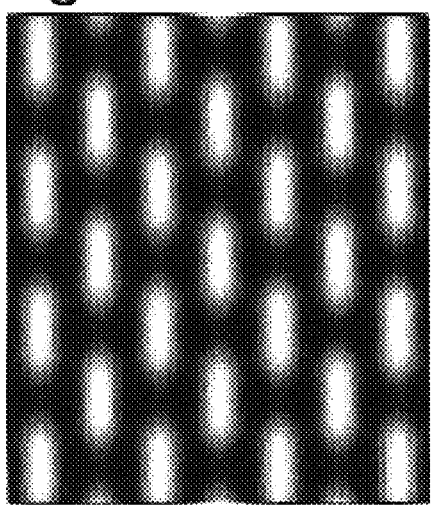
FIG. 7(a) illustrates the interference pattern produced by the present invention for an incident quasi-monochromatic plane wave whose state of polarization is linear with an azimuth of 0 degrees.
Figure 7B:
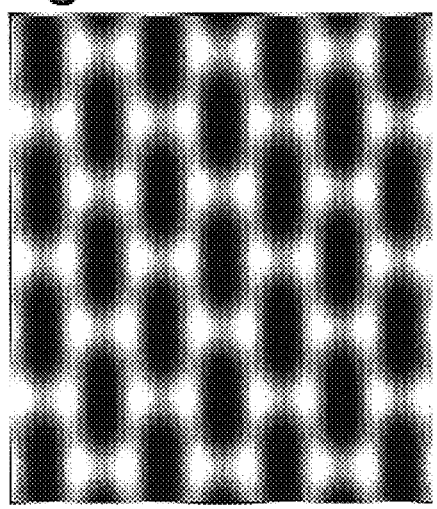
FIG. 7(b) illustrates the interference pattern produced by the present invention for an incident quasi-monochromatic plane wave whose state of polarization is linear with an azimuth of 90 degrees.
Figure 7C:
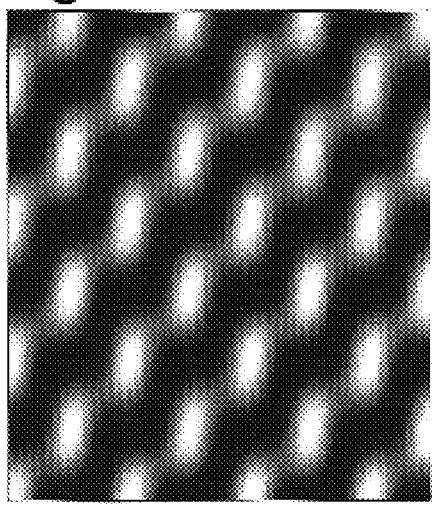
FIG. 7(c) illustrates the interference pattern produced by the present invention for an incident quasi-monochromatic plane wave whose state of polarization is linear with an azimuth of 45 degrees.
Figure 7D:
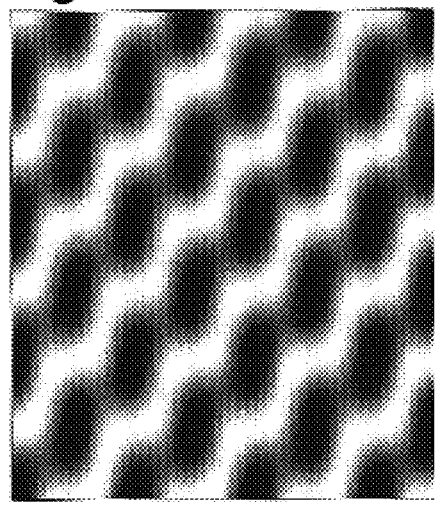
FIG. 7(d) illustrates the interference pattern produced by the present invention for an incident quasi-monochromatic plane wave whose state of polarization is linear with an azimuth of 135 degrees.
Figure 7E:
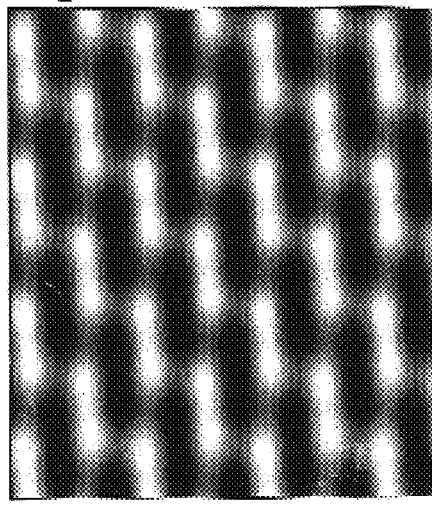
FIG. 7(e) illustrates the interference pattern produced by the present invention for an incident quasi-monochromatic plane wave that is right circularly polarized.
Figure 7F:
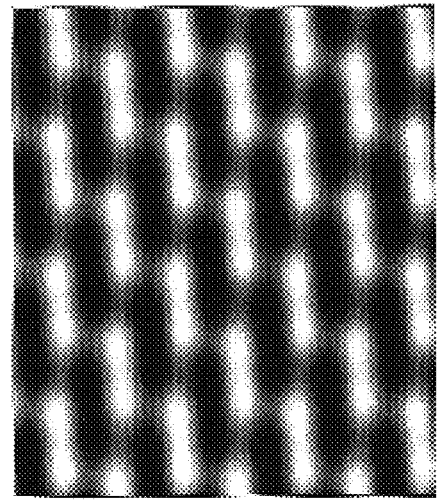
FIG. 7(f) illustrates the interference pattern produced by the present invention for an incident quasi-monochromatic plane wave that is left circularly polarized.

FIGS. 7(a) through 7(f) depict a characteristic set of polarization-encoded irradiance fringe systems or interferograms produced by the OBPI filter using quasi-monochromatic, plane wave illumination. FIG. 7(a) illustrates the fringe system that results when linearly polarized light with an azimuth of 0 degrees (Stokes vector $\vec{S}=[1,1,0,0]^t$, where superscript t denotes the transpose) is incident upon the OBPI filter. FIG. 7(b) illustrates the fringe system that results when linearly polarized light with an azimuth of 90 degrees ($\vec{S}=[1,-1,0,0]^t$) is incident upon the OBPI filter. FIG. 7(c) illustrates the fringe system that results when linearly polarized light with an azimuth of 45 degrees ($\vec{S}=[1,0,1,0]^t$) is incident upon the OBPI filter. FIG. 7(d) illustrates the fringe system that results when linearly polarized light with an azimuth of 135 degrees ($\vec{S}=[1,0,-1,0]^t$) is incident upon the OBPI filter. FIG. 7(e) illustrates the fringe system that results when right circularly polarized light ($\vec{S}=[1,0,0,1]^t$) is incident upon the OBPI filter. Finally, FIG. 7(f) illustrates the fringe system that results when left circularly polarized light ($\vec{S}=[1,0,0,-1]^t$) is incident upon the OBPI filter.

Discretization of the aforementioned irradiance fringe system by a two-dimensional array of electronic point detectors 78 produces a set of raw data. The disposition of the various elements comprising the OBPI filter assembly allows a unique mathematical reconstruction algorithm to be fashioned such that one or more of the following parameters of interest, i.e., measurands, may be computed from the raw data:

i) the instantaneous, complete state of polarization, i.e., the Stokes vector, across a partially-polarized image comprised of a plurality of wavefronts as a function of transverse position; and ii) the size, orientation, shape and handedness of the polarization ellipse and the degree of polarization on a point-by-point basis across a partially-polarized image comprised of a plurality of wavefronts; and iii) the instantaneous spectral content across a uniform image whose individual spectral components have the same state of polarization.

6. Deployment Schemes for Viewing the Irradiance Fringe System

Depending on the nature of the wavefront ensemble under test and the accuracy required of the measurements, the polarization-encoded irradiance fringe system generated by the OBPI filter may be viewed for interpretation in a variety of different ways.

Figure 8:
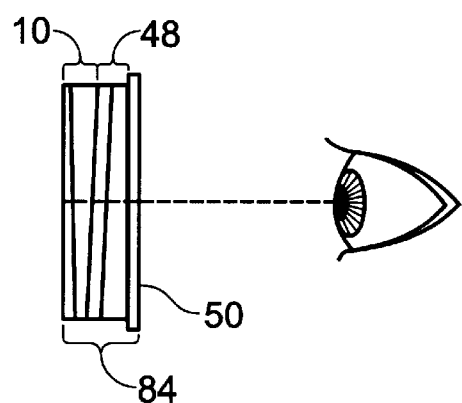
FIG. 8 is a side view of an OBPI filter assembly according to the present invention, whose interference pattern is qualitatively viewed by the human eye.

In FIG. 8, the OBPI filter assembly 84, comprising a first modified Babinet system 10, a second modified Babinet system 48 and a polarizer 50, is positioned at the near-point of the human eye. In this simple deployment scheme, the polarization-encoded interference pattern generated by the filter is qualitatively viewed by the unaided human eye and interpreted based on prior experience. By way of example, one may view a scene of interest through the OBPI filter and qualitatively infer its polarization content by recalling from memory the characteristic fringe systems pertaining to certain polarization states. Only the polarized component of the scene will give rise to irradiance fringes. The unpolarized component will pass through the OBPI filter largely unaffected. Any resulting fringes will overlap the scene so that one may recognize local regions within the scene with specific polarization content.

Figure 9:
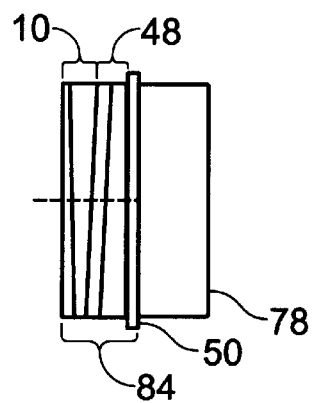
FIG. 9 is a side view of an OBPI filter assembly according to the present invention, whose interference pattern is quantitatively interrogated by a two-dimensional electronic detector array bonded to the filter.

In FIG. 9, the OBPI filter assembly 84, comprising a first modified Babinet system 10, a second modified Babinet system 48 and a polarizer 50, is positioned immediately adjacent to a two-dimensional array of electronic point detectors 78. In this deployment scheme, the continuous polarization-encoded interference pattern generated by the filter is discretized by the detector array and subsequently digitized for computer interpretation via a unique mathematical reconstruction algorithm. The detector array discretely samples the continuous fringe system so as to produce a measurable electronic analog response representative of the spatially averaged illumination level seen by each element in the array. Depending on the accessibility of the detector array, the OBPI filter 84 may be permanently bonded directly to the surface of the array in lieu of a protective glass coverplate. However, for a spatially-incoherent test wavefront ensemble, such mounting practices require design optimization of the OBPI filter assembly in order to produce a polarization-encoded interference pattern that is localized at the surface of the detector array.

Figure 10:
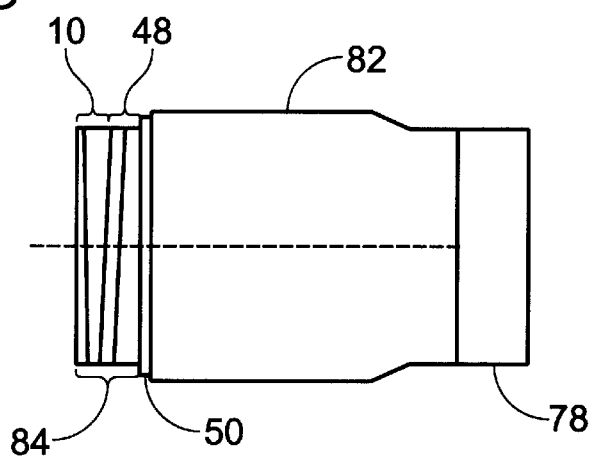
FIG. 10 is a side view of an OBPI filter assembly according to the present invention, temporarily mounted to a fused, coherent, fiber-optic bundle whose "conducted" polarization-encoded image is then interrogated by a two-dimensional electronic detector array bonded to the fiber bundle.

In FIG. 10, the OBPI filter assembly 84, comprising a first modified Babinet system 10, a second modified Babinet system 48 and a polarizer 50, is positioned immediately adjacent to a fused, "coherent", fiber-optic bundle 82, i.e., an "image conduit," that is further positioned immediately adjacent to a two-dimensional array of electronic point detectors 78. In this alternative deployment scheme, the continuous polarization-encoded interference pattern generated by the filter is first discretized by the "coherent" fiber-optic bundle and then "conducted" along its length only to be further discretized by the detector array and interpreted in a manner similar to that described above. In this scenario, the OBPI filter 84 can be temporarily mounted to the fiber-optic bundle 82 using an index matching gel. Such a mounting practice enables one to trivially remove the OBPI filter 84 should one choose to do so. Furthermore, should the need arise, the fiber-optic bundle 82 can be tapered in such a manner so as to increase or decrease the dimensional scale of the irradiance fringe system presented to the detector array. However, use of a fiber-optic bundle in this manner for measuring a spatially-incoherent test wavefront ensemble requires design optimization of the OBPI filter assembly in order to localize the resulting polarization-encoded irradiance fringe system at the input surface of the bundle.

Figure 11:
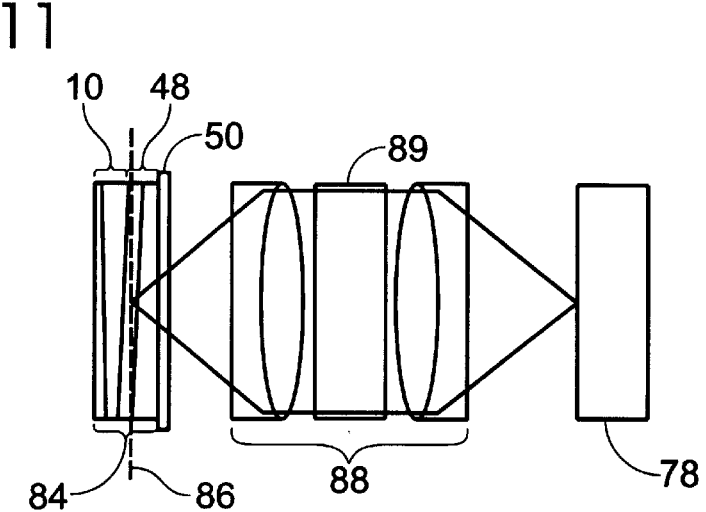
FIG. 11 is a side view of an OBPI filter assembly according to the present invention, wherein a polarization-encoded image is optically relayed to a two-dimensional electronic detector array.

In FIG. 11, the OBPI filter assembly 84, comprising a first modified Babinet system 10, a second modified Babinet system 48 and a polarizer 50, is positioned at the conjugate plane 86 of a relay lens system 88 whereby the polarization-encoded interference pattern generated by the filter is re-imaged onto a two-dimensional array of electronic point detectors 78. This alternative deployment of the OBPI filter is recommended when the input wavefront ensemble to be measured has a less-than-ideal degree of spatial coherence.

If the interference pattern is highly localized within the mechanical confines of the OBPI filter, the use of an ancillary relay lens system enables one to effectively position the surface of the detector array precisely where the fringes are localized. For an imaging polarimeter instrument, this is the preferred deployment means, as it allows a larger numerical aperture imaging system to be employed.

Should one decide to make use of zoom lenses in such a relay system, one would be able to continuously vary the dimensional scale of the irradiance fringe system presented to the detector array. This permits flexibility in the design of an OBPI filter and facilitates its use with an even broader range of detector geometries.

In a low-noise, high-accuracy, scientific-grade deployment of the OBPI filter, it may be necessary for the detector array 78 to reside within an evacuated, cooled environment. A relay lens system 88 interposed between the OBPI filter 84 and electronic detector array 78 may facilitate the use of such an environment.

Furthermore, the use of a relay lens system between the OBPI filter and detector array is compatible with microlenses employed for increasing detector fill-factors and interlaced color filters employed for color digital photography.

If spectral content of the incident test wavefront ensemble is desired, one may add spectral interrogating means 89 in the conveniently "collimated" region of space between the elements comprising the relay lens system 88. As such, deployment of the OBPI filter assembly using a relay lens system is applicable to an imaging spectro-polarimeter configuration.

Deployment of the OBPI filter assembly using a relay lens system between the filter and detector array allows the end user a maximum of instrument design flexibility. Such deployment of the OBPI filter along with suitable spectral interrogating means enables one to easily convert any conventional irradiance imaging system into an imaging spectro-polarimeter instrument in a non-permanent, convenient manner.

7. Formulation of a Unique Mathematical Reconstruction Algorithm

In formulating a mathematical reconstruction algorithm, an operational approach is adopted whereby the "input", denoted as $\vec{f}$ is representative of the continuous, spatially-varying id state of polarization or "polarization signature" contained within some wavefront ensemble of interest. The corresponding "output", denoted as $\vec{g}$, is representative of the discretized, pixel illumination levels in a two-dimensional electronic detector array whose purpose is to quantitatively interrogate the continuous, polarization-encoded irradiance fringe system produced by the OBPI filter assembly. In operator form, the mapping from "input" space to "output" space looks like $$\vec{g} = H\{\vec{f}\}$$

where H is a linear mapping operator. The Mueller calculus provides a good starting point for the derivation of the required reconstruction algorithm.

a. Application of the Mueller Calculus

In the particular embodiment shown in FIG. 5, the OBPI filter assembly 84, comprising a first modified Babinet system 10, a second modified Babinet system 48 and a polarizer 50, is functionally equivalent to a three-stage optical system consisting of two spatially-varying linear retarders followed by a linear polarizer. Each spatially-varying linear retarder is characterized by a fast axis azimuth $\theta_{FA}(x,y)$ and retardance $\delta(x,y)$ that vary as a function of position. The linear polarizer is characterized by the azimuth of its transmission axis $\theta_{TA}$ Consequently, the three-stage optical system that models the behavior of the OBPI filter assembly is described by five optical construction parameters: $\theta_{FA_1}(x,y)$, $\delta_1(x,y)$, $\theta_{FA_2}(x,y)$, $\delta_2(x,y)$ and $\theta_{TA}$.

Applying the Mueller calculus to the three-stage OBPI filter assembly gives rise to an output stokes vector of the form:

$$\vec{S}'(x,y) = M_{OBPI}(x,y)\vec{S}(x,y)$$

Multiplying out the individual Mueller matrices that comprise the OBPI filter in reverse order, as is customary when employing the Mueller calculus, including the explicit spatial dependence of the optical construction parameters produces:

$$\vec{S}'(x,y) = [M_{LinPol}(\theta_{TA}) \cdot M_{LinRet2}(\theta_{FA_2}(x,y), \delta_2(x,y)) \cdot M_{LinRet1}(\theta_{FA_1}(x,y), \delta_1(x,y))] \cdot \vec{S}(x,y)$$

where $M_{LinPol}(\theta_{TA})$ is the Mueller matrix for a linear polarizer, $M_{LinRet1}(\theta_{FA_1}(x,y), \delta_1(x,y))$ is the Mueller matrix for the first spatially-varying retarder, and $M_{LinRet2}(\theta_{FA_2}(x,y), \delta_2(x,y))$ is the Mueller matrix for the second spatially-varying retarder.

Explicitly multiplying out the three aforementioned Mueller matrices and extracting the zeroeth element of the resulting output Stokes vector leads to:

$$S_0'(x,y) = [k_1(x,y)]S_0(x,y) + [k_2(x,y)]S_1(x,y) + [k_3(x,y)]S_2(x,y) + [k_4(x,y)]S_3(x,y) \quad (1)$$

where $k_p(x,y) = [M_{OBPI}(x,y)]_{1,p}$ and $S_0(x,y), S_1(x,y), S_2(x,y)$ and $S_3(x,y)$ are the incident Stokes vector components to be determined. This expression governs the amount of light that passes through the OBPI filter, on a point-by-point basis, as a function of the incident state of polarization and the optical construction parameters.

b. Detector Array Interrogation of the Irradiance Fringe System

The OBPI filter is ordinarily, but not necessarily, employed in an imaging context that utilizes a two-dimensional array of electronic point detectors. Although their name suggests otherwise, point detectors must have some finite lateral extent over which spatial integration of the incident illumination level produces a measurable electronic analog response that is representative of that illumination level. Such spatial discretization and subsequent "intensity" digitization are fundamental parts of the digital imaging process and must be carefully considered in the formulation of a mathematical reconstruction algorithm.

In practice, the continuous polarization-encoded irradiance fringe system generated by the OBPI filter assembly, or an image of this encoded fringe system, is made to fall onto the detector array surface. As such, the OBPI filter can be considered to be effectively superposed onto the detector array.

Figure 12:
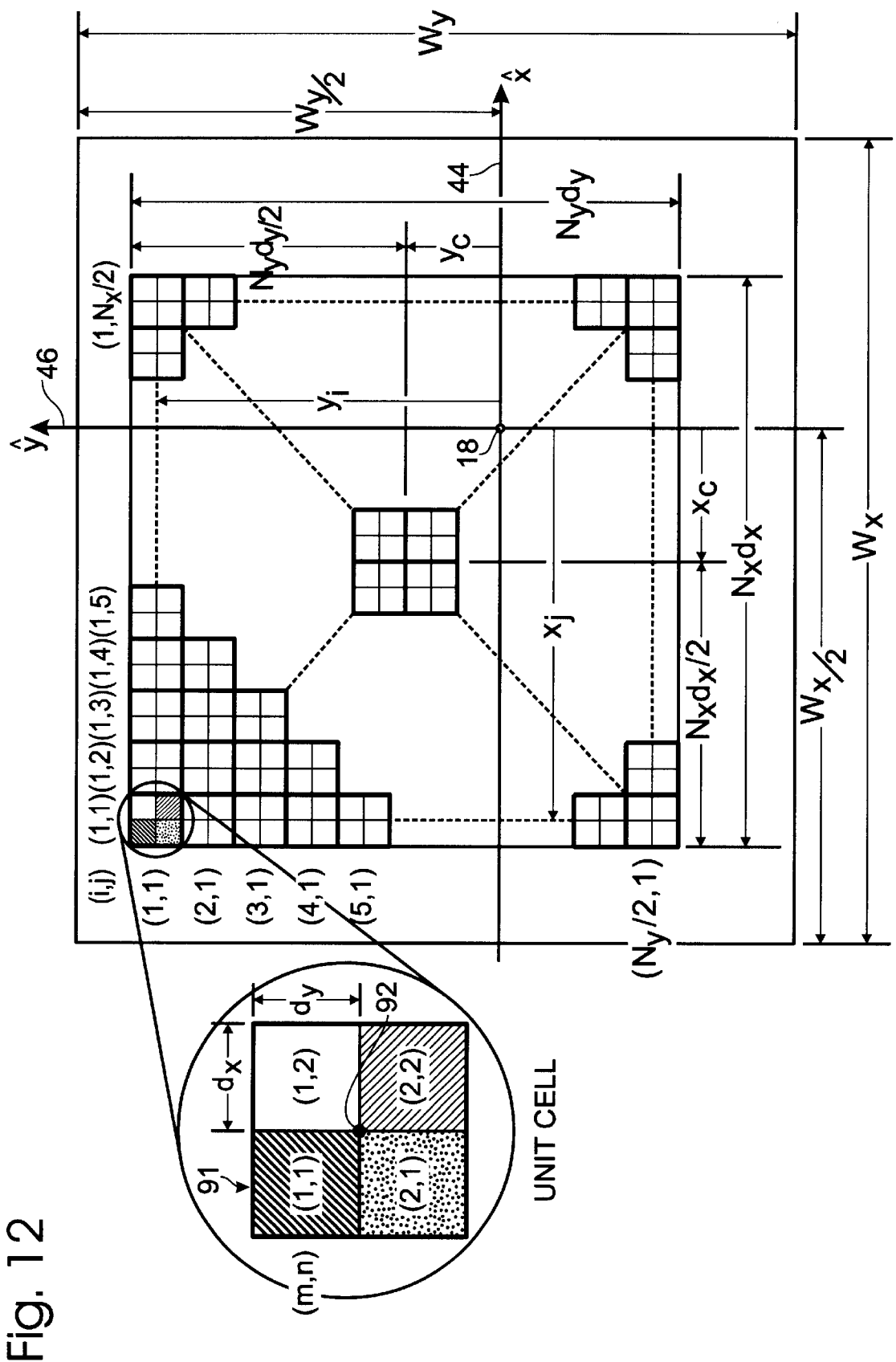
FIG. 12 illustrates the individual picture elements, i.e., pixels, comprising a two-dimensional electronic detector array including the structure of a "unit cel."

FIG. 12 illustrates a two-dimensional detector array comprised of $N_x$ by $N_y$ total pixels, centered on a point $(x_c, y_c)$ measured relative to the $\hat{x}$ and $\hat{y}$ axes of a right-handed Cartesian coordinate system whose corresponding $\hat{z}$ axis is the mechanical centerline axis of the superposed OBPI filter. $d_x$ and $d_y$ denote the width of a single pixel along the $\hat{x}$ and $\hat{y}$ directions respectively. $W_x$ and $W_y$ denote the width of the OBPI filter along the $\hat{x}$ and $\hat{y}$ directions respectively.

c. The Unit Cell

Any given pixel in the detector array is characterized by the set of four indices (i,j,m,n) where (i,j) indicates a specific "unit cell" and (m,n) indicates a pixel within the selected unit cell. A "unit cell" 91 is simply a square 2×2 array of pixels representing the minimum spatially resolvable polarization picture element. The center 92 of any given unit cell (i,j), measured relative to the mechanical centerline axis 18 of the OBPI filter, is defined by the coordinates $(x_j, y_i)$ such that $$x_j = \left[ -x_c - \frac{N_x d_x}{2} + d_x + 2d_x(j-1) \right] \quad (2)$$

and $$y_i = \left[ y_c + \frac{N_y d_y}{2} - d_y - 2d_y(i-1) \right]$$

To define a single pixel in the array, a unit cell is chosen and then one of the four pixels comprising that unit cell is selected. In this way, the set of indices (i,j,m,n) defines a specific pixel within the detector array.

FIG. 13 depicts the geometry of a single unit cell 91 that suggests the use of piecewise continuous "rect" functions to single out an individual pixel over which integration will occur. Upon careful consideration, one may define a two-dimensional function $pix_{ijmn}(x,y)$, indexed by (i,j,m,n) that singles out an individual pixel in the array according to $$pix_{ijmn}(x, y) = \left[ rect\left( \frac{x - (x_j + (-1)^n \frac{d_x}{2})}{d_x} \right) \right] \left[ rect\left( \frac{y - (y_i + (-1)^{m+1} \frac{d_y}{2})}{d_y} \right) \right] \quad (3)$$

d. Continuous-to-Discrete Mapping Operation

Integrating over the zeroeth component of the output Stokes vector $S_0'(x,y)$, weighted by the window function $pix_{ijmn}(x,y)$, allows one to express the spatially averaged optical power incident upon a single pixel by an expression of the form:

$$g_{ijmn} = \quad (4)$$

$$\left(\frac{1}{d_x d_y}\right) \int_{x=-\infty}^{x=+\infty} \int_{y=-\infty}^{y=+\infty} pix_{ijmn}(x,y)[k_1(x,y)S_0(x,y) + k_2(x,y)S_1(x,y) +$$

$$k_3(x, y)S_2(x, y) + k_4(x, y)S_3(x, y)]\, dxdy$$

Re-labeling the incident Stokes vector components according to $f_p(x,y) = S_{p-1}(x,y)$ enables one to re-write equation (4) So that $$g_{ijmn} =$$

$$\left(\frac{1}{d_x d_y}\right) \int_{x=-\infty}^{x=+\infty} \int_{y=-\infty}^{y=+\infty} pix_{ijmn}(x,y)[k_1(x,y)f_1(x,y) + k_2(x,y)f_2(x,y) + k_3(x,y)$$

$$f_3(x, y) + k_4(x, y)f_4(x, y)]\, dxdy$$

By employing a summation over four terms, one may rewrite the previous equation according to $$g_{ijmn} = \left(\frac{1}{d_x d_y}\right) \int_{-\infty}^{+\infty} \int_{-\infty}^{+\infty} pix_{ijmn}(x, y) \sum_{p=1}^{4} k_p(x, y) f_p(x, y)\, dxdy \quad (5)$$

Recognizing that the sum of four products is equivalent to the scalar product, i.e., inner product, of two, four-dimensional vectors and employing the use of vector notation allows one to rewrite equation (5) into the final form:

$$\vec{g} = H_{CD}\{\vec{f}\} \text{ or } g_{\vec{q}} = \int_{-\infty}^{+\infty}\int_{-\infty}^{+\infty} \vec{f}(\vec{r}) \vec{h}_{\vec{q}}(\vec{r}) d^2 r \quad (6)$$

where $$\vec{r} = (x,y)\, d^2r = dxdy\, \vec{q} = (i,j,m,n)\, \vec{f}(\vec{r}) =$$
$$\vec{f}(x,y) = (f_1(x,y), f_2(x,y), f_3(x,y), f_4(x,y))$$

and $$\vec{h}_{\vec{q}}(\vec{r}) =$$

$$\vec{h}_{ijmn}(x, y) = \left[\frac{1}{d_x d_y} pix_{ijmn}(x, y)\right](k_1(x, y), k_2(x, y), k_3(x, y), k_4(x, y))$$

Equation (6) represents a continuous-to-discrete (CD) operator mapping from the incident state of polarization to the spatially discretized pixel illumination levels. This equation characterizes what is commonly referred to as the "forward" problem. Ultimately, the goal is to compute the incident state of polarization from the spatially discretized pixel illumination levels. This represents what is commonly referred to as the "reverse" problem. In practice, one must typically make some type of approximation in order to solve the reverse problem.

e. Polarization Domains

A "polarization domain" is defined as the smallest area element over which the state of polarization is constant. This notion permits an important approximation in the continuous-to-discrete mapping operation described earlier.

FIG. 14 depicts a "polarization domain" 90 approximately centered at 92 the center of an arbitrary unit cell 91. When the characteristic size of a polarization domain is approximately equal to or larger than the dimensions of a single unit cell, then the state of polarization is more or less constant across the unit cell.

In an imaging context, this condition can be satisfied in practice by merely making a judicious choice for the magnification of the imaging system. When observing some distant object of interest whose polarization content we wish to study, the magnification will determine the size of the corresponding image incident upon the OBPI filter. In other words, the system magnification directly controls the size of the polarization domains comprising the image. If the magnification is too small, then the polarization domains in the image will be smaller than the unit cell and the spatially-varying state of polarization across the image cannot be resolved. If the magnification is too large, then the spatially-varying polarization content across the image can be resolved, but the limited size of the detector array could substantially reduce the effective field over which the object is viewed.

If one selects the system magnification to satisfy the condition that the smallest polarization domain in the image is equal to or larger than the unit cell an important simplification of the aforementioned continuous-to-discrete mapping operation results.

f. Discrete-to-Discrete Mapping Operation

When the average size of a polarization domain is equal to or larger than the size of a unit cell, the state of polarization is constant over all four pixels comprising that unit cell. Since the integration in equation (5) is effectively over a single pixel, due to the window function $pix_{ijmn}(x,y)$, $f_p(x,y)$ can be removed from the integrand and re-labeled to reflect its constancy across the unit cell such that $f_p(x,y) \rightarrow \hat{f}_{ijp}$, where the ^ denotes that a discretized approximation has been made.

Interchanging the order of integration and summation simplifies the problem. Unlike the continuous-to-discrete mapping case, the integration can now be done without knowing the incident state of polarization. The forward problem has been simplified to a discrete-to-discrete (DD) mapping operation:

$$g_{ijmn} = \sum_{p=1}^{4} \left(\frac{1}{d_x d_y}\right) \int_{-\infty}^{+\infty}\int_{-\infty}^{+\infty} pix_{ijmn}(x,y) k_p(x,y) \, dx \, dy \, \hat{f}_{ijp} \quad \text{or} \quad (7)$$

$$g_{ijmn} = \sum_{p=1}^{4} h_{ijmnp} \hat{f}_{ijp} \quad \text{where}$$

$$h_{ijmnp} = \left(\frac{1}{d_x d_y}\right) \int_{-\infty}^{+\infty}\int_{-\infty}^{+\infty} pix_{ijmn}(x,y) k_p(x,y) \, dx \, dy$$

Writing out equation (7) in detail for $(m,n)=(1,1), (1,2), (2,1)$ and $(2,2)$ produces four equations and four unknowns, which can be solved using linear algebra, as follows:

$$g_{ij11} = h_{ij111}\hat{f}_{ij1} + h_{ij112}\hat{f}_{ij2} + h_{ij113}\hat{f}_{ij3} + h_{ij114}\hat{f}_{ij4}$$

$$g_{ij12} = h_{ij121}\hat{f}_{ij1} + h_{ij122}\hat{f}_{ij2} + h_{ij123}\hat{f}_{ij3} + h_{ij124}\hat{f}_{ij4}$$

$$g_{ij21} = h_{ij211}\hat{f}_{ij1} + h_{ij212}\hat{f}_{ij2} + h_{ij213}\hat{f}_{ij3} + h_{ij214}\hat{f}_{ij4}$$

$$g_{ij22} = h_{ij221}\hat{f}_{ij1} + h_{ij222}\hat{f}_{ij2} + h_{ij223}\hat{f}_{ij3} + h_{ij224}\hat{f}_{ij4}$$

Introducing a slight change in notation helps in the algebraic bookkeeping that follows.

$$\vec{g} = \begin{bmatrix} g_{ij11} \\ g_{ij12} \\ g_{ij21} \\ g_{ij22} \end{bmatrix} = \begin{bmatrix} g_1 \\ g_2 \\ g_3 \\ g_4 \end{bmatrix}, \quad \vec{f} = \begin{bmatrix} \hat{f}_{ij1} \\ \hat{f}_{ij2} \\ \hat{f}_{ij3} \\ \hat{f}_{ij4} \end{bmatrix} = \begin{bmatrix} f_1 \\ f_2 \\ f_3 \\ f_4 \end{bmatrix} \quad \text{and}$$

$$H = \begin{bmatrix} h_{ij111} & h_{ij112} & h_{ij113} & h_{ij114} \\ h_{ij121} & h_{ij122} & h_{ij123} & h_{ij124} \\ h_{ij211} & h_{ij212} & h_{ij213} & h_{ij214} \\ h_{ij221} & h_{ij222} & h_{ij223} & h_{ij224} \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix}$$

Utilizing this more conventional notation, the forward problem, characterized by a discrete-to-discrete mapping operation, takes on the rather simple form.

$$\vec{g} = H_{DD}\{\vec{f}\} \quad \text{or} \quad \vec{g} = H\vec{f} \quad (8)$$

where H is a square matrix and $\vec{g}$ and $\vec{f}$ are column vectors.

g. The Reverse Problem: Calculating the Inverse

The reverse problem is to compute the state of polarization across the partially-polarized image given the spatially integrated pixel illumination levels. Multiplying each side of equation is (8) by the inverse of matrix H and noting that $H^{-1}H$ is the identity matrix I produces $$H^{-1}\vec{g} = H^{-1}H\vec{f} = I\vec{f} = \vec{f} \quad \text{or} \quad \vec{f} = H^{-1}\vec{g} \quad (9)$$

so that $$\begin{bmatrix} \hat{f}_{ij1} \\ \hat{f}_{ij2} \\ \hat{f}_{ij3} \\ \hat{f}_{ij4} \end{bmatrix} = \begin{bmatrix} [H^{-1}]_{11} & [H^{-1}]_{12} & [H^{-1}]_{13} & [H^{-1}]_{14} \\ [H^{-1}]_{21} & [H^{-1}]_{22} & [H^{-1}]_{23} & [H^{-1}]_{24} \\ [H^{-1}]_{31} & [H^{-1}]_{32} & [H^{-1}]_{33} & [H^{-1}]_{34} \\ [H^{-1}]_{41} & [H^{-1}]_{42} & [H^{-1}]_{43} & [H^{-1}]_{44} \end{bmatrix} \begin{bmatrix} g_{ij11} \\ g_{ij12} \\ g_{ij21} \\ g_{ij22} \end{bmatrix}$$

Since $\hat{S}_{ij(p-1)} = \hat{f}_{ijp}$, the Stokes vector components may be explicitly written for each unit cell (i,j) as $$\hat{S}_{ij0} = \hat{f}_{ij1} = [H^{-1}]_{11}g_{ij11} + [H^{-1}]_{12}g_{ij12} + [H^{-1}]_{13}g_{ij21} + [H^{-1}]_{14}g_{ij22}$$

$$\hat{S}_{ij1} = \hat{f}_{ij2} = [H^{-1}]_{21}g_{ij11} + [H^{-1}]_{22}g_{ij12} + [H^{-1}]_{23}g_{ij21} + [H^{-1}]_{24}g_{ij22}$$

$$\hat{S}_{ij2} = \hat{f}_{ij3} = [H^{-1}]_{31}g_{ij11} + [H^{-1}]_{32}g_{ij12} + [H^{-1}]_{33}g_{ij21} + [H^{-1}]_{34}g_{ij22}$$

$$\hat{S}_{ij3} = \hat{f}_{ij4} = [H^{-1}]_{41}g_{ij11} + [H^{-1}]_{42}g_{ij12} + [H^{-1}]_{43}g_{ij21} + [H^{-1}]_{44}g_{ij22}$$

The inverse matrix coefficients for each term of the equations above are comprised of integrals over space and can be computed prior to image acquisition and stored in a look-up table. Such an approach to the reconstruction algorithm allows the polarimetric data to be computed in a quasi-real time fashion. The mechanical construction parameters for the OBPI filter are specifically selected in order to guarantee a non-zero determinant required of the approach outlined above.

8. Calibration of the OBPI Filter

The function of the OBPI filter is to encode uniquely an input wavefront ensemble in a controlled, deterministic manner so as to map the spatially-varying state of polarization across the ensemble to variations in an irradiance fringe system or interferogram. Knowing, a priori, the specific mechanical construction parameters of the filter, the polarization information contained within the interference pattern can be effectively decoded, thus ascertaining the polarization content across the input ensemble.

Using the Mueller or Jones calculus, one is able to formulate a tenable, closed-form, analytic solution when there are no errors present in the construction of the device under study. That is, knowing precisely each and every construction parameter with great accuracy permits the aforementioned mathematical reconstruction algorithm to be employed with impunity. In practice however, this is rarely the case. Even just a few angular errors present in the mechanical construction parameters of the filter causes the complexity of the mathematical analysis to grow substantially. To avoid this tenuous analytic exercise, a calibration routine is used. The purpose D of the routine is to calibrate out errors in the construction parameters of the OBPI filter to more accurately compute the polarimetric parameters of interest from the raw data.

a. The Instrument Matrix

The OBPI filter polarization-encoding process was described above as a discrete-to-discrete mapping operation according to the equation $\vec{g} = H\vec{f}$, where $\vec{g}$ is a four-element column vector whose components describe the pixel illumination levels within any given unit cell, $\vec{f}$ is a four-element column vector whose components are the Stokes parameters for the unit cell in question, and H is a Mueller matrix that characterizes both the polarization encoding properties of the OBPI filter and the discretization operation performed by the detector array. Contained in H are all of the mechanical construction parameters of the OBPI filter assembly and the geometry of the detector array.

A new Mueller matrix A, called the "instrument matrix," can be defined to characterize the real behavior of the OBPI filter encoding process. In other words, A and H are equal if there are no construction errors present in the OBPI filter assembly. H represents the ideal behavior of the system, wherein the value of every construction parameter present is precisely known. A represents the real behavior of the system, which may include one or more errors in the manufacture or assembly of the OBPI filter system. Using the instrument matrix, the-discrete-to-discrete mapping operation can be described by $$\vec{g} = A\vec{f}$$

where:

$$\vec{g} = \begin{bmatrix} g_{ij11} \\ g_{ij12} \\ g_{ij21} \\ g_{ij22} \end{bmatrix} = \begin{bmatrix} g_1 \\ g_2 \\ g_3 \\ g_4 \end{bmatrix}, \vec{f} = \begin{bmatrix} \hat{f}_{ij1} \\ \hat{f}_{ij2} \\ \hat{f}_{ij3} \\ \hat{f}_{ij4} \end{bmatrix} = \begin{bmatrix} f_1 \\ f_2 \\ f_3 \\ f_4 \end{bmatrix} \text{ and}$$

$$A = \begin{bmatrix} a_{ij111} & a_{ij112} & a_{ij113} & a_{ij114} \\ a_{ij121} & a_{ij122} & a_{ij123} & a_{ij124} \\ a_{ij211} & a_{ij212} & a_{ij213} & a_{ij214} \\ a_{ij221} & a_{ij222} & a_{ij223} & a_{ij224} \end{bmatrix} = \begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix}$$

The problem is to (1) experimentally determine the instrument matrix A, (2) compute its inverse, and (3) compute the Stokes parameters for each unit cell given the pixel illumination levels according to $\vec{f} = A^{-1}\vec{g}$.

b. Polarization Calibration States

In order to calibrate the imaging polarimeter instrument, made possible by the OBPI filter assembly, four well-defined states of polarization are directed onto the filter and the resulting fringe systems are recorded. These four calibration states result in sixteen simultaneous equations from which the sixteen elements of the instrument matrix can be solved. Any four calibration states can be chosen, provided that they are linearly independent; however, some choices are better than others by virtue of their mathematical simplicity. In addition, because of the errors present in the system, four calibration states should be selected that are substantially different from one another.

In a preferred method, a uniform, quasi-monochromatic, plane wave that is linearly polarized along the horizontal $\hat{x}$ axis is selected as the first polarization calibration state. A superscript 1 denotes the first calibration state. This plane wave is directed across the full aperture of the OBPI filter assembly. A linearly polarized plane wave, with an azimuth of zero degrees, is represented by a normalized Stokes vector of the form $\vec{S} = [1100]^t$. If this plane wave uniformly illuminates the OBPI filter assembly then each unit cell in the detector array will see the same state of polarization and the following matrix equation applies:

$$\begin{bmatrix} g^{(1)}_1 \\ g^{(1)}_2 \\ g^{(1)}_3 \\ g^{(1)}_4 \end{bmatrix} = \begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix} \begin{bmatrix} 1 \\ 1 \\ 0 \\ 0 \end{bmatrix}$$

Writing out the equations explicitly produces $$g^{(1)}_1 = A_{11} + A_{12}\ g^{(1)}_2 = A_{21} + A_{22}\ g^{(1)}_3 = A_{31} + A_{32} \text{ and } g^{(1)}_4 = A_{41} + A_{42}$$

For the second polarization calibration state, denoted by superscript 2, a uniform, quasi-monochromatic, plane wave that is linearly polarized along the vertical $\hat{y}$ axis is selected. This produces $$g^{(2)}_1 = A_{11} - A_{12}\ g^{(2)}_2 = A_{21} - A_{22}\ g^{(2)}_3 = A_{31} - A_{32} \text{ and } g^{(2)}_4 = A_{41} - A_{42}$$

The resulting equations can be solved by inspection to give eight of the sixteen elements comprising the instrument matrix. Accordingly, $$A_{11} = \frac{1}{2}[g^{(1)}_1 + g^{(2)}_1] \qquad A_{21} = \frac{1}{2}[g^{(1)}_2 + g^{(2)}_2]$$

$$A_{31} = \frac{1}{2}[g^{(1)}_3 + g^{(2)}_3] \qquad A_{41} = \frac{1}{2}[g^{(1)}_4 + g^{(2)}_4]$$

$$A_{12} = \frac{1}{2}[g^{(1)}_1 - g^{(2)}_1] \qquad A_{22} = \frac{1}{2}[g^{(1)}_2 - g^{(2)}_2]$$

$$A_{32} = \frac{1}{2}[g^{(1)}_3 - g^{(2)}_3] \qquad A_{42} = \frac{1}{2}[g^{(1)}_4 - g^{(2)}_4]$$

For the third polarization calibration state, denoted by superscript 3, a uniform, quasi-monochromatic, plane wave that is linearly polarized with an azimuth of 45 degrees measured ccw from the $\hat{x}$ axis is selected. Accordingly, $$g^{(3)}_1 = A_{11} + A_{13}\ g^{(3)}_2 = A_{21} + A_{23}\ g^{(3)}_3 = A_{31} + A_{33} \text{ and } g^{(3)}_4 = A_{41} + A_{43}$$

Since $A_{11}$, $A_{21}$, $A_{31}$ and $A_{41}$ are known, $A_{13}$, $A_{23}$, $A_{33}$ and $A_{43}$ can be solved by inspection. The results are $$A_{13} = g^{(3)}_1 - \frac{1}{2}[g^{(1)}_1 + g^{(2)}_1] \qquad A_{23} = g^{(3)}_2 - \frac{1}{2}[g^{(1)}_2 + g^{(2)}_2]$$

$$A_{33} = g^{(3)}_3 - \frac{1}{2}[g^{(1)}_3 + g^{(2)}_3] \qquad A_{43} = g^{(3)}_4 - \frac{1}{2}[g^{(1)}_4 + g^{(2)}_4]$$

The fourth and last polarization calibration state, denoted by superscript 4, is a right circularly AD polarized uniform, quasi-monochromatic, plane wave. Accordingly, $$g^{(4)}_1 = A_{11} + A_{14}\ g^{(4)}_2 = A_{21} + A_{24}\ g^{(4)}_3 = A_{31} + A_{34} \text{ and } g^{(4)}_4 = A_{41} + A_{44}$$

As before, since $A_{11}$, $A_{21}$, $A_{31}$ and $A_{41}$ are known, $A_{14}$, $A_{24}$, $A_{34}$ and $A_{44}$ can be solved by inspection. The results are $$A_{14} = g^{(4)}_1 - \frac{1}{2}[g^{(1)}_1 + g^{(2)}_1] \qquad A_{24} = g^{(4)}_2 - \frac{1}{2}[g^{(1)}_2 + g^{(2)}_2]$$

$$A_{34} = g^{(4)}_3 - \frac{1}{2}[g^{(1)}_3 + g^{(2)}_3] \qquad A_{44} = g^{(4)}_4 - \frac{1}{2}[g^{(1)}_4 + g^{(2)}_4]$$

With the components of the instrument matrix A determined, all that remains to be done is to numerically invert the matrix and utilize the result to compute the incident Stokes vector for each unit cell (i,j) from the discretized pixel illumination levels according to $$\vec{f} = A^{-1}\vec{g} \text{ or } \begin{bmatrix} \hat{f}_{ij1} \\ \hat{f}_{ij2} \\ \hat{f}_{ij3} \\ \hat{f}_{ij4} \end{bmatrix} = \begin{bmatrix} [A^{-1}]_{11} & [A^{-1}]_{12} & [A^{-1}]_{13} & [A^{-1}]_{14} \\ [A^{-1}]_{21} & [A^{-1}]_{22} & [A^{-1}]_{23} & [A^{-1}]_{24} \\ [A^{-1}]_{31} & [A^{-1}]_{32} & [A^{-1}]_{33} & [A^{-1}]_{34} \\ [A^{-1}]_{41} & [A^{-1}]_{42} & [A^{-1}]_{43} & [A^{-1}]_{44} \end{bmatrix} \begin{bmatrix} g_{ij11} \\ g_{ij12} \\ g_{ij21} \\ g_{ij22} \end{bmatrix}$$

9. The Snap Shot Imaging Stokes Polarimeter Instrument

Ordinarily, but not necessarily, the OBPI filter assembly according to the present invention will be employed in an imaging context to make possible what shall be called a "SnapShot Imaging Stokes Polarimeter Instrument." In other words, an instrument that is capable of simultaneously measuring all four Stokes parameters across an image in a no-moving-parts, essentially instantaneous, i.e., "SnapShot," manner.

Referring to FIG. 15, the Snap Shot Imaging Stokes Polarimeter Instrument 90, according to the present invention, is a low-noise, scientific-grade, complete imaging polarimeter preferably comprising a narrow bandpass filter 80, an imaging system 86, an OBPI filter assembly 84, a relay lens system 88, a two-dimensional electronic detector array 78, a digital camera 83 that further comprises an electromechanical shutter 85, a Peltier cooled, vacuum compatible detector socket 94, a low-noise signal amplifier 96, an analog-to-digital converter ("ADC") 98, thermo-electric ("TE") cooler drive electronics 100 and camera power supply 102. A digital computer 104, whose memory contents include the mathematical reconstruction algorithm, computer monitor 106 and ancillary input devices not shown, i.e., keyboard and mouse, complete the instrument.

Upon recognizing some distant object of interest whose polarization content one wishes to study, the SnapShot Imaging Stokes Polarimeter Instrument 90 is directed toward that object such that narrow bandpass filter 80 and imaging system 86 collectively form a quasi-monochromatic irradiance image on the entrance face of the OBPI filter 84. The OBPI filter assembly 84 uniquely encodes the input image in a controlled, deterministic manner so as to map the spatially-varying state of polarization across the image to variations in an irradiance fringe system or interferogram. The two-dimensional, TE cooled, electronic detector array 78 discretizes the continuous polarization-encoded interference pattern presented to it by relay lens system 88 so as to produce a measurable electronic analog response representative of the spatially averaged illumination level seen by each pixel element in the array. The analog photocurrents produced by the detector array are converted to voltages and amplified by amplifier 96 prior to digitization via the analog-to-digital converter 98. The discretized, digitized pixel illumination levels comprise a set of raw data that is made accessible to the computer 104 and its associated memory storage means. Contained within the memory of computer 104 is a software program that comprises a mathematical reconstruction algorithm employed to decode the polarization content, i.e., Stokes parameters, for each unit cell comprising the detector array from the discretized, digitized pixel illumination levels, i.e., raw data. From the Stokes parameters one may compute other complete polarimetric data sets, such as: major-axis azimuth ("ψ"), ellipticity angle ("χ"), amplitude ("A") and degree of polarization ("DOP"). Such data can be displayed on the computer monitor 106 in a variety of different ways. From the polarization content of the image, one can infer certain polarimetric properties of the original conjugate object. In so doing, one's ability to discern between that object and some other similar object is enhanced.

10. Example Computation of Stokes Images

FIGS. 16(a) through 16(d) illustrate the polarization-encoding and reconstruction processes applied to a partially-polarized irradiance image observed by the Snap Shot Imaging Stokes Polarimeter Instrument made possible by the present invention.

Figure 16A:
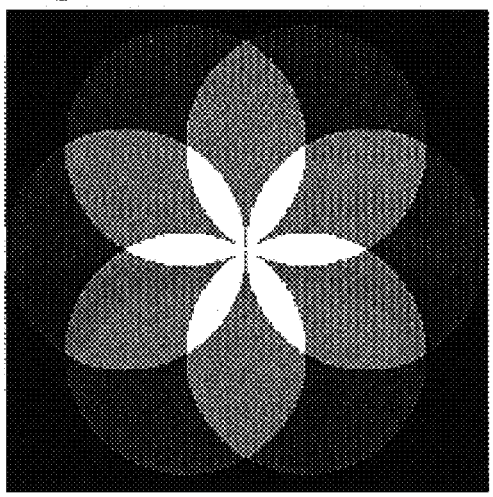
FIG. 16(a) illustrates a partially-polarized irradiance image.

FIG. 16(a) depicts a partially-polarized, irradiance image comprised of a set of six overlapping circular regions. Each of the circular regions is characterized by a different state of polarization.

Figure 16B:
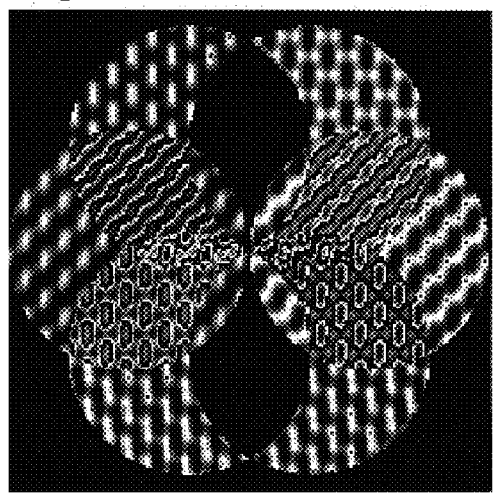
FIG. 16(b) illustrates a continuous, polarization-encoded irradiance image.

FIG. 16(b) depicts a continuous, polarization-encoded image that results when the irradiance image of FIG. 16(a) is passed through the OBPI filter assembly. In any given region of the polarization-encoded image, the specific shape of the interference fringes determines the size (amplitude), orientation (azimuth), shape (ellipticity) and handedness (chirality) of the polarization ellipse within that region. Furthermore, the visibility of the interference fringes within any given region indicates the DOP within that region. Accordingly, the complete state of to polarization within any given region or sub-region of the irradiance image is uniquely encoded in the local interference pattern appearing in that region. For example, in FIG. 16(b) the two crescent-shaped sub-regions devoid of interference fringes indicate regions within the original irradiance image whose degree of polarization is zero.

Figure 16C:
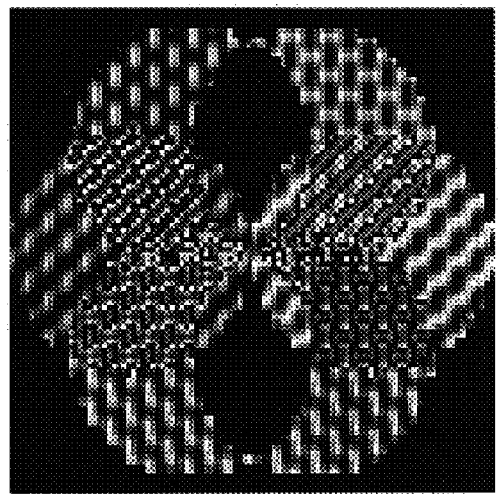
FIG. 16(c) illustrates a discretized-digitized, polarization-encoded image.

FIG. 16(c) depicts the electronic image that results after spatial discretization by the detector array and electronic digitization by the ADC. The discretized-digitized electronic image comprises a set of raw data that is inputted into the mathematical reconstruction algorithm.

Figure 16D:
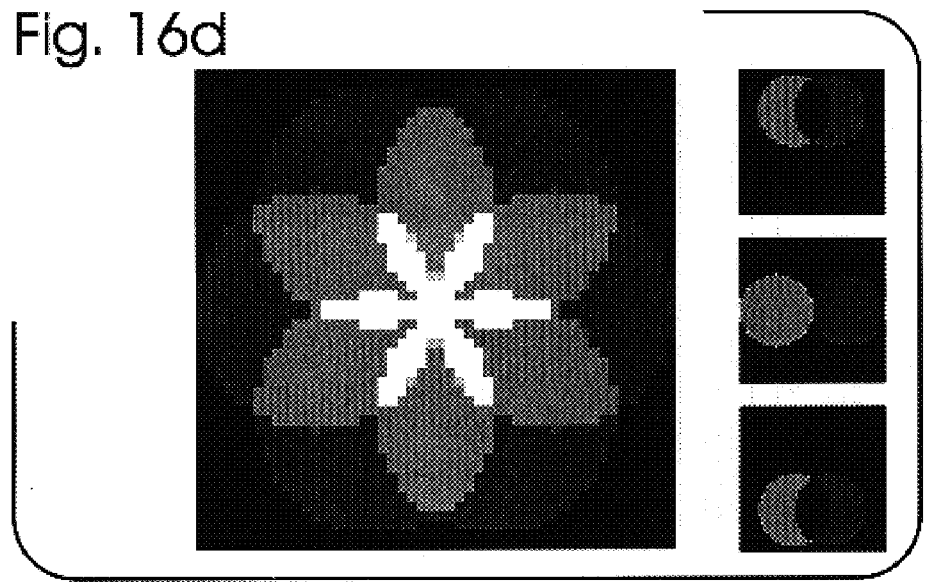
FIG. 16(d) illustrates a set of reconstructed Stokes images.

FIG. 16(d) depicts the reconstructed Stokes images that result from the mathematical reconstruction process. In the absence of noise, the reconstructed zeroeth Stokes image is equivalent to a 2×2 "binned" version of the original irradiance image whose polarization content one wishes to measure. From the reconstructed Stokes images it is possible to compute the polarimetric parameters of interest across the original irradiance image and thus infer polarization content of the corresponding conjugate object wavefront ensemble.

11. Applications for the Interferometric Polarization Interrogating Filter Assembly Among other things, the interferometric polarization interrogating filter assembly of the present invention (1) enables instantaneous measurement of the complete state of polarization across an image thus facilitating its use for in situ biological studies of moving test subjects; (2) facilitates imaging ellipsometry so that material properties can be determined instantaneously over some finite lateral extent without the need for scanning; (3) reduces energy and weight requirements thereby improving space-borne instrumentation; (4) allows simultaneous measurement of polarization and spectral content of fiber-optic signals over a narrow spectral region; and (5) enables instantaneous interrogation of the polarization content of both military and non-military images to enhance the discriminatory capabilities of conventional imaging systems.

Other potential applications for the invention described herein include optical component metrology, polarized light microscopy, astronomical polarization signatures, biological polarization signatures, security identification signatures, anti-counterfeiting measures, biometric measurement, crime scene investigation, laser beam metrology, pharmaceutical and chemical polarization signatures, satellite identification, machine vision, remote sensing, autonomous navigation, automated manufacturing, quality control, entomological studies, vegetation mapping, optical cross-connects, Mueller matrix imaging polarimetry, free-space optical communication, phase shifting interferometry, photo-elastic monitoring, rocket plume polarization signatures, polarization BRDF, polarization mode dispersion compensation, imaging spectro-polarimetry, satellite image enhancement, magneto-optic data storage, polarization aberrations and liquid crystal display metrology.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims which follow.

I claim:

1. An interferometric polarization interrogating filter assembly, comprising:

a first retardation encoding element for receiving a partially-polarized primary image, splitting said primary image into two orthogonally polarized secondary eigen images and retarding one said secondary eigen image relative to the other in a spatially-varying manner;

a second retardation encoding element for receiving said secondary eigen images, splitting each said secondary eigen image into two orthogonally polarized tertiary eigen images and retarding one said tertiary eigen image relative to the other in a spatially-varying manner; and a polarizer for receiving said tertiary eigen images and preferentially transmitting those components of said tertiary eigen images that are substantially equivalent to the major eigenpolarization state of said polarizer, thereby allowing a polarization-encoded irradiance fringe system to be formed.

2. The assembly of claim 1, further comprising a detector for receiving said polarization-encoded irradiance fringe system and producing an electronic image representative thereof.

3. The assembly of claim 2, further comprising an imaging system for receiving said polarization-encoded irradiance fringe system and producing an image of said fringe system at said detector.

4. The assembly of claim 3, wherein said imaging system comprises one or more refractive or reflective elements.

5. The assembly of claim 3, wherein said imaging system comprises a bundle of waveguides.

6. The assembly of claim 2, further comprising a processor for interpreting said electronic image and producing therefrom data representative of the spatial distribution of polarization across said primary image.

7. The assembly of claim 1, wherein said polarizer is a linear polarizer.

8. The assembly of claim 1, wherein said polarizer is a circular polarizer.

9. The assembly of claim 1, wherein said polarizer is an elliptical polarizer.

10. The assembly of claim 1, wherein said polarizer is comprised of form-dichroic nano-engineered material.

11. The assembly of claim 1, further comprising an imaging system for producing at the entrance face of said first retardation encoding element an image of an object as said primary image.

12. The assembly of claim 1, wherein said first and second retardation encoding elements each comprise a spatially-varying retarder, each spatially-varying retarder comprising:

a first birefringent wedge having an entrance face, a first wedge face inclined to said entrance face, a line substantially perpendicular to said entrance face defining a mechanical axis, and a first crystal axis, said mechanical axis and the surface normal to said first wedge face defining a first wedge plane, said mechanical axis and said first crystal axis defining a first crystal axis plane, the angle between said first wedge plane and said first crystal axis plane being between zero and ninety degrees, exclusive thereof, and a second birefringent wedge having an exit face substantially perpendicular to said mechanical axis, a second wedge face inclined to said exit face, and a second crystal axis, said mechanical axis and the surface normal to said second wedge face defining a second wedge plane, said mechanical axis and said second crystal axis defining a second crystal axis plane, the angle between said second wedge plane and said second crystal axis plane being between zero and ninety degrees, exclusive thereof, and said second wedge plane being coplanar with said first wedge plane, said first and second spatially-varying retarders being aligned so that the entrance face of said second spatially-varying retarder addresses and overlaps the exit face of said first spatially-varying retarder;

the first and second coplanar wedge planes of said second spatially-varying retarder are substantially perpendicular to the first and second coplanar wedge planes of said first spatially-varying retarder; and the first and second crystal axis planes of said second spatially-varying retarder are different from the first and second crystal axis planes of said first spatially-varying retarder.

13. The assembly of claim 12 wherein in each of said spatially-varying retarders said second wedge face is disposed immediately adjacent to said first wedge face.

14. The assembly of claim 12, wherein in each of said spatially-varying retarders said second crystal axis plane is substantially perpendicular to said first crystal axis plane.

15. The assembly of claim 12, further comprising a half-wave plate interposed between said second wedge face and said first wedge face, and wherein in each of said spatially-varying retarders said second crystal axis plane is substantially parallel to said first crystal axis plane.

16. The assembly of claim 12, wherein one or more of said birefringent wedges are comprised of linearly, circularly or elliptically birefringent material.

17. The assembly of claim 12, wherein one or more of said birefringent wedges are comprised of form-birefringent, nano-engineered materials.

18. The assembly of claim 12, wherein said polarizer is a linear polarizer whose transmission axis falls outside any of said first wedge plane, said first crystal axis plane, said second wedge plane, and said second crystal axis plane of said first and second spatially-varying retarders.

19. The assembly of claim 12, wherein said polarizer has an entrance face and exit face substantially perpendicular to said mechanical axis, said entrance face of said polarizer being disposed so as to address and overlap the exit face of said second retardation encoding element.

20. The assembly of claim 12, wherein, said second retardation encoding element is disposed immediately adjacent to said first retardation encoding element, and said polarizer is disposed immediately adjacent to said second retardation encoding element.

21. The assembly of claim 12, further comprising a detector array having an entrance face, said detector array being disposed on said mechanical axis so that said entrance face of said detector array interrogates said polarization-encoded irradiance fringe system thereby producing a discretized electronic image representative thereof.

22. The assembly of claim 21, wherein said first and second birefringent wedges of said first and second retardation encoding elements, said polarizer and said detector array are centered about said mechanical axis.

23. The assembly of claim 21, wherein said entrance face of said detector array is substantially perpendicular to said mechanical axis.

24. The assembly of claim 21, further comprising a data processor responsive to said detector array for interpreting said electronic image.

25. The assembly of claim 24, wherein said data processor is a programmed digital computer whose memory contents include a mathematical reconstruction algorithm for decoding the polarimetric parameters of interest from said electronic image.

26. The assembly of claim 25, wherein said digital computer is programmed to calculate, from said irradiance fringe system, the spatial distribution of polarization across the ensemble of wavefronts comprising said partially-polarized primary image formed at the entrance face of said first retardation encoding element.

27. The assembly of claim 1, further comprising photographic film for receiving a polarization-encoded irradiance fringe system and storing an image thereof.

28. A method for determining the spatially-distributed state of polarization of a partially-polarized primary wavefront ensemble, comprising:

operating on said primary wavefront ensemble so as to divide said primary ensemble into orthogonally polarized components and retarding one said orthogonal component relative to the other in a spatially-varying manner, thereby producing a secondary wavefront ensemble;

operating on said secondary wavefront ensemble so as to divide said secondary ensemble into orthogonally polarized components and retarding one said orthogonal component relative to the other in a spatially-varying manner, thereby producing a tertiary wavefront ensemble; and operating on said tertiary wavefront ensemble so as to transmit preferentially polarized components, thereby allowing the formation of a polarization-encoded irradiance fringe system.

29. The method of claim 28, wherein said step of operating on said primary wavefront ensemble comprises introducing a first, linear phase-retardation gradient therein.

30. The method of claim 29, wherein said step of operating on said secondary wavefront ensemble comprises introducing a second, linear phase-retardation gradient therein whose direction is different from said first, linear phase-retardation gradient.

31. The method of claim 28, further comprising detecting said polarization-encoded irradiance fringe system.

32. The method of claim 28, further comprising producing a discretized electronic image representative of said polarization-encoded irradiance fringe system.

33. The method of claim 32, further comprising operating on said electronic image so as to determine the spatial distribution of polarization across said primary wavefront ensemble.

34. The method of claim 33, wherein said step of operating on said electronic image comprises a mapping operation from irradiance variations in said polarization-encoded irradiance fringe system to spatial variations in the complete state of polarization across said primary wavefront ensemble.

35. The method of claim 28, further comprising producing said primary wavefront ensemble by imaging an object with light.

36. The method of claim 28, further comprising imaging said polarization-encoded irradiance fringe system onto a detector array to produce an electronic image representative thereof.

37. The method of claim 28, further comprising imaging said polarization-encoded irradiance fringe system onto a photographic film to produce a stored image representative thereof.

* * * * *